United States Patent
Shapira et al.

(10) Patent No.: US 11,651,304 B2
(45) Date of Patent: *May 16, 2023

(54) SYSTEMS AND METHOD FOR MESSAGE-BASED CONTROL AND MONITORING OF A BUSINESS PROCESS

(71) Applicant: CONTROLS FORCE LTD., Ness Ziona (IL)

(72) Inventors: Boris Shapira, Kiryat Tivon (IL); Vladimir Forfutdinov, Macomb, MI (US)

(73) Assignee: CONTROLS FORCE LTD., Ness Ziona (IL)

( * ) Notice: Subject to any disclaimer, the term of this patent is extended or adjusted under 35 U.S.C. 154(b) by 179 days.

This patent is subject to a terminal disclaimer.

(21) Appl. No.: 17/384,572

(22) Filed: Jul. 23, 2021

(65) Prior Publication Data

US 2021/0350293 A1 Nov. 11, 2021

Related U.S. Application Data

(63) Continuation of application No. 14/583,270, filed on Dec. 26, 2014, now Pat. No. 11,113,639, which is a continuation of application No. 12/377,341, filed as application No. PCT/IL2007/001011 on Aug. 13, 2007, now abandoned.

(60) Provisional application No. 60/822,238, filed on Aug. 13, 2006.

(51) Int. Cl.
| G06Q 10/00 | (2023.01) |
| G06Q 10/063 | (2023.01) |
| G06Q 30/04 | (2012.01) |
| G06Q 10/06 | (2023.01) |
| G06Q 40/00 | (2023.01) |
| G06F 17/00 | (2019.01) |

(52) U.S. Cl.
CPC .......... *G06Q 10/063* (2013.01); *G06Q 10/00* (2013.01); *G06Q 10/06* (2013.01); *G06Q 30/04* (2013.01); *G06Q 40/00* (2013.01); *G06F 17/00* (2013.01)

(58) Field of Classification Search
CPC ....... G06Q 10/063; G06Q 30/04; G06Q 10/00
USPC ...................................... 705/7.27
See application file for complete search history.

(56) References Cited

U.S. PATENT DOCUMENTS

| 6,225,998 B1 | 5/2001 | Okita et al. |
| 7,539,746 B2 | 5/2009 | Bankier et al. |
| 7,698,186 B2 | 4/2010 | Botzer et al. |

(Continued)

OTHER PUBLICATIONS

J. H. Betzing, "Design and Development of an Event-driven In-memory Business Process Engine," 2017 IEEE 19th Conference on Business Informatics (CBI), Thessaloniki, Greece, 2017, pp. 23-32 (Year: 2017).*
International Search Report and Written Opinion issued in International Application No. PCT/IL2007/001011 dated Aug. 22, 2008.
International Preliminary Report on Patentability issued in International Application No. PCT/IL2007/001011 dated Mar. 23, 2010.

(Continued)

*Primary Examiner* — Rutao Wu
*Assistant Examiner* — Tyrone E Singletary
(74) *Attorney, Agent, or Firm* — Polsinelli PC

(57) ABSTRACT

A system for monitoring and controlling a business process involving a plurality of workstations or/and computerized services, the system comprising apparatus for receiving messages exchanged between the plurality of workstations or computerized services and having content, and for deriving from the content of the messages, monitoring information regarding the single business process.

22 Claims, 27 Drawing Sheets

(56) References Cited

U.S. PATENT DOCUMENTS

| | | | |
|---|---|---|---|
| 2003/0055668 A1* | 3/2003 | Saran | G06F 9/542 |
| | | | 709/201 |
| 2004/0078340 A1 | 4/2004 | Evans | |
| 2004/0098311 A1 | 5/2004 | Nair et al. | |
| 2004/0133544 A1 | 7/2004 | Kiessig et al. | |
| 2004/0167795 A1 | 8/2004 | Tanaka et al. | |
| 2004/0181462 A1 | 9/2004 | Bauer et al. | |
| 2004/0260591 A1 | 12/2004 | King | |
| 2005/0192816 A1 | 9/2005 | Wechsel | |
| 2005/0193061 A1 | 9/2005 | Schmidt et al. | |
| 2006/0085243 A1 | 4/2006 | Cooper et al. | |
| 2006/0095372 A1 | 5/2006 | Venkatasubramanian et al. | |
| 2006/0168132 A1 | 7/2006 | Bunter et al. | |
| 2007/0008179 A1 | 1/2007 | Hedley et al. | |
| 2007/0027801 A1* | 2/2007 | Botzer | G06Q 40/04 |
| | | | 705/39 |
| 2007/0244910 A1 | 10/2007 | Mital et al. | |

OTHER PUBLICATIONS

Yassine, "An Introduction to Modeling and Analyzing Complex Product Development Processes Using the Design Structure Matrix (DSM) Method" Quademi di Management (Italian Management Review), www.quaderni-di-management.it, 2004, No. 9, pp. 1-17.

Kueng et al., "How to Compose an Object-Oriented Business Process Model" Proceedings of the IFIP WG8.1/WG8.2 Working Conference, Aug. 26-28, 1996, Atlanta, pp. 1-16.

Hollingsworth, "Workflow Management Coalition the Workflow Reference Model" TC00-1003, Issue 1.1, Jan. 19, 1995, The Workflow Management Coalition, pp. 1-55.

Ross, "Structure Analysis (SA): A Language for Communicating Ideas" IEEE Transactions on Software Engineering, Jan. 1977, vol. SE-3, No. 1, pp. 16-34.

Carzaniga et al., "A Routing Scheme for Content-Based Networking" 2003, pp. 1-16.

* cited by examiner

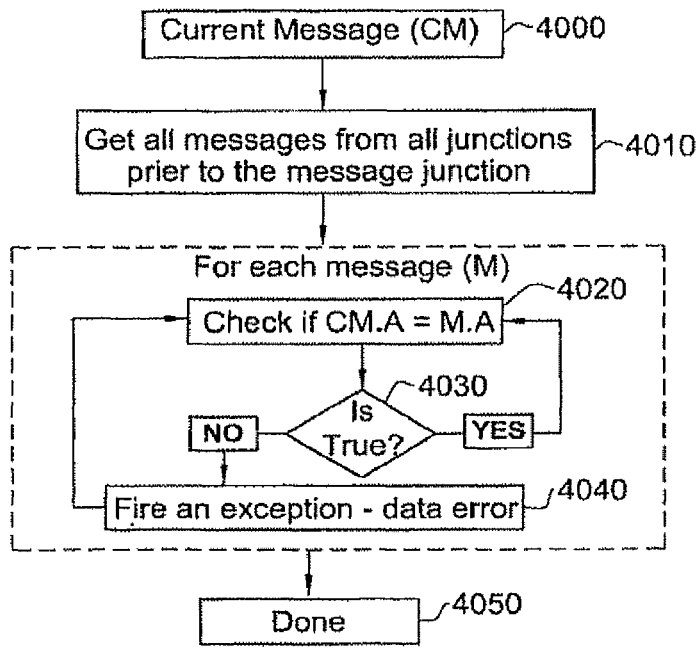

Fig. 20

| Alert/ARM action | Number of Rule |
|---|---|
| Error in data <DataName>/ paint the message junction in yellow | I |
| Correct Junction color/ cancel yellow (return junction in normal color) save the data error fixed date in DB | II |
| Inappropriately altering information <DataName>/ paint the message junction in Red | III |
| Double Payment for <SupplierNumber> occurs/ paint the message junction in Red | IV |
| Fraud: Ghost Invoice paint the message junction in Red | V |
| Fraud or Error occurs. Check <DataName/s/ paint the message junction in Red | VI |
| Fraud or Error occurs. Check the item return process/ paint the message junction in Red | VII - XI |

Fig. 21

Audit Database Model Implementation
Transactions -Process Instance
Processdefinition -Process Id

| # | Junction/Message | Follows after junction# | Meta-tag fields | Field Weight | Adaptor type number |
|---|---|---|---|---|---|
| 1 | PO Requisition | | Item name | 0.4 | 5 |
| | | | po date | 0.4 | |
| | | | supplier name | 0.4 | |
| | | | responsible name | 0.4 | |
| 2 | Approved PO By 1st Mngr | 1, optionally | Item name | 0.4 | 5 |
| | | | po date | 0.4 | |
| | | | supplier name | 0.4 | |
| | | | responsible name | 0.4 | |
| 3 | Approved PO By 2nd Mngr | 2, optionally | Item name | 0.4 | 5 |
| | | | po date | 0.4 | |
| | | | supplier name | 0.4 | |
| | | | responsible name | 0.4 | |
| 4 | Approved PO By 3rd Mngr | 2 or 3, optionally | Item name | 0.4 | 5 |
| | | | po date | 0.4 | |
| | | | supplier name | 0.4 | |
| | | | responsible name | 0.4 | |
| 5 | Sent PO | 1 or 2, or 3, or 4 | Item name | 0.4 | 1 or 2 |
| | | | po date | 0.4 | |
| | | | supplier name | 0.4 | |
| | | | responsible | 0.4 | |

Fig. 23A

|   |   |   | name | 0.4 |   |
|---|---|---|---|---|---|
|   |   |   | poNumber |   |   |
| 6 | Invoice receipt | 5, optionally | poNumber<br>po date<br>supplier name<br>Item name | 1.0<br>0.4<br>0.4<br>0.4 | 4 |
| 7 | Invoice record | 5 or 6 | Invoice #<br>poNumber<br>po date<br>supplier name<br>Item name | 1.0<br>1.0<br>0.4<br>0.4<br>0.4 | 5 |
| 8 | Payment voucher | 5 or 7 | Invoice #<br>poNumber<br>Supplier name<br>Total sum | 1.0<br>1.0<br>0.5<br>0.5 | 5 |
| 9 | Approved payment voucher | 8 | Invoice #<br>poNumber<br>Supplier name<br>Total sum | 1.0<br>1.0<br>0.5<br>0.5 | 5 |
| 10 | Signed check | 9 | Invoice #<br>poNumber<br>Supplier name<br>Total sum | 1.0<br>1.0<br>0.5<br>0.5 | 1 or 2 |

Fig. 23B

| 11 | Check distribution form | 10 | Invoice # | 1.0 | 4 |
| | | | poNumber | 1.0 | |
| | | | Supplier name | 0.5 | |
| | | | Total sum | 0.5 | |
| 12 | Sent check | 10 or 11 | Invoice # | 1.0 | 1 or 2 |
| | | | poNumber | 1.0 | |
| | | | Supplier name | 0.5 | |
| | | | Total sum | 0.5 | |
| 13 | Updated payable record | 9, optionally | Invoice # | 1.0 | 5 |
| | | | poNumber | 1.0 | |
| | | | Supplier name | 0.5 | |
| | | | Total sum | 0.5 | |
| 14 | Receiving report | 5 | poNumber | 1.0 | 4 |
| | | | po date | 0.4 | |
| | | | supplier name | 0.4 | |
| | | | Item name | 0.4 | |
| 15 | New inventory record | 14 | poNumber | 1.0 | 5 |
| | | | po date | 0.4 | |
| | | | supplier name | 0.4 | |
| | | | Item name | 0.4 | |
| 16 | New fixed asset record | 15 or 14 | poNumber | 1.0 | 5 |
| | | | po date | 0.4 | |
| | | | supplier name | 0.4 | |
| | | | Item name | 0.4 | |

Fig. 23C

| 17 | New General Lager record | 14 or 15 or 16 | poNumber<br>po date<br>supplier name<br>Item name | 1.0<br>0.4<br>0.4<br>0.4 | 5 |
|---|---|---|---|---|---|
| 18 | Return report | 14 or 15, or 16, or 17, optionally | poNumber<br>po date<br>supplier name<br>Item name | 1.0<br>0.4<br>0.4<br>0.4 | 4 |
| 19 | Canceled fixed asset | 18 | poNumber<br>po date<br>supplier name<br>Item name | 1.0<br>0.4<br>0.4<br>0.4 | 5 |
| 20 | New account receivable record | 18 or 19 | Invoice #<br>Supplier name<br>Responsible name<br>Item name | 1.0<br>0.4<br>0.4<br>0.4 | 5 |

Fig. 23D

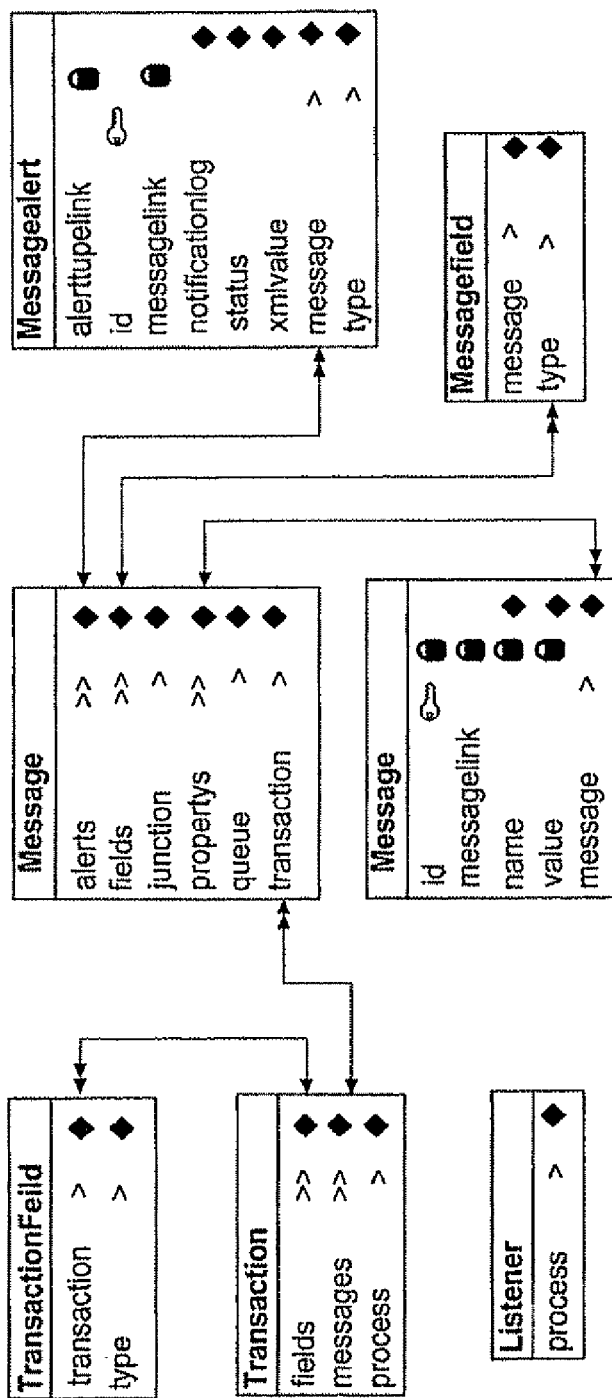
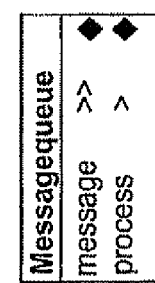
Fig. 24A
Fig. 24B

SYSTEMS AND METHOD FOR MESSAGE-BASED CONTROL AND MONITORING OF A BUSINESS PROCESS

REFERENCE TO CO-PENDING APPLICATIONS

Priority is claimed from U.S. provisional application 60/822,238, entitled "Overall business process control and monitoring method and system", filed 13 Aug. 2006.

FIELD OF THE INVENTION

The present invention relates generally to systems for control and monitoring of business processes.

BACKGROUND OF THE INVENTION

An example of a state of the art BPM system is US 20060085243, "Business process management method and system".

ADIS is an open environment for BPM which includes programmable message oriented middleware.

Wikipedia states that "A Business Process is a collection of interrelated tasks, which solve a particular issue. There are three types of business processes:

1. Management processes—the processes that govern the operation of a system. Typical management processes include "Corporate Governance" and "Strategic Management".

2. Operational processes—these processes create the primary value stream, and they are part of the core business. Typical operational processes are Purchasing, Manufacturing, Marketing, and Sales.

3. Supporting processes—these support the core processes. Examples include Accounting, Recruitment, IT-support.

"A business process can be decomposed into several sub-processes, which have their own attributes, but also contribute to achieving the goal of the super-process. The analysis of business processes typically includes the mapping of processes and sub-processes down to activity level.

"Activities are parts of the business process that do not include any decision making and thus are not worth decomposing (although decomposition would be possible), such as "Answer the phone", "produce an invoice".

"Business Process Modeling Notation can be used for drawing business processes in a workflow."

Again according to Wikipedia, "Business process management (BPM) is a field of knowledge at the intersection between management and information technology, encompassing methods, techniques and tools to design, enact, control, and analyze operational business processes involving humans, organizations, applications, documents and other sources of information.[1] The term 'operational business processes' refers to repetitive business processes performed by organizations in the context of their day-to-day operations, as opposed to strategic decision-making processes which are performed by the top-level management of an organization. BPM differs from business process reengineering, a management approach popular in the 1990s, in that it does not aim at one-off revolutionary changes to business processes, but at their continuous evolution. In addition, BPM usually combines management methods with information technology.

"BPM covers activities performed by organizations to manage and, if necessary, to improve their business processes. While such a goal is hardly new, software tools called business process management systems (BPM systems) have made such activities faster and cheaper. BPM systems monitor the execution of the business processes that are under its management (coordination or orchestration), so that managers can analyze and change processes in response to KPI (Key Performance Indicators).

"The activities which constitute business process management can be grouped into three categories: design, execution and monitoring . . . .

"Business rules have been used by systems to provide definitions for governing behavior, and a business rule engine can be used to drive process execution and resolution.

"Process monitoring . . . encompasses the tracking of individual processes so that information on their state can be easily seen and statistics may be provided on the performance of one or more processes. An example of such tracking is being able to determine the state of a customer order (e.g. order arrived, awaiting delivery, invoice paid) so that problems in its operation can be identified and corrected. In addition, this information can be used to work with customers and suppliers to improve their connected processes. Examples of such statistics are the generation of measures applied in KPI on how quickly a customer order is processed, how many orders were processed in the last month etc. These measures tend to fit into three categories: cycle time, defect rate and productivity. In any case, business processes in a BPMS are a software driven process and shall be explicitly described prior to execution. No BPM system enables long-running overall business process monitoring at the single process level (instance level).

The degree of monitoring depends on what information a business would like to evaluate and analyze, and how a business wishes to be monitored, in real-time or on an ad-hoc basis. In the latter, business activity monitoring (BAM) extends and expands the monitoring tools in BPMS, but its operations are aimed to provide KPI, rather than monitor the single process in run-time.

The disclosures of all publications and patent documents mentioned in the specification, and of the publications and patent documents cited therein directly or indirectly, are hereby incorporated by reference.

SUMMARY OF THE INVENTION

An embodiment of the present invention seeks to provide a monitoring method and system for overall as-is business process control and tracking.

An embodiment of the invention relates to controlling and monitoring of an individual complex enterprise process that crosses different IT (Information Technology) systems (business applications and services), connected and disconnected, inside and outside of an enterprise, including collaborative activities, human driven or unstructured processes, throughout Internet and non-structured data sources, based on a method of process-instance identification from extracted message-instance content. Some of monitored processes may comprise a Business Process Management (BPM) System. Thus our invention provides a system that is functioning up of operational BPMS.

An embodiment of the present invention comprises a method of monitoring an overall business process through a content-routed network, message brokers, and a content management system comprising content-based building of a network of processing messages, creating a meta-tag at each message-class involved in the network, getting message-instances from a message repository created by each of at least one underlying message routers during message transportation, connecting a received message-instance to a process-instance in accordance with the message-class meta-tag and data centric process flow network; and handling the received message-instances related to the same process-instance in accordance with the said network.

A vast number of publications are available which describe BPM (business process management) methods and tools. Conventional BPM (business process management) methods all require, as an underlying component in the work-centric (workflow) process model, a modeling tool and a workflow-based process execution engine for process coordination and orchestration, and only then for process control and monitoring.

The work-centric process model, also known as an event-based, or business rules driven model is by definition a logical model with regular connections between activities. It is the only approach that is applied in any business process automation, analysis, and management field. All BPM (business process management) tools operate either by being connected directly to business applications, or by being part of business applications, and it is generally required that all business processes involved in the overall process should be electronically integrated.

The work-centric process model may have different forms such as Workflow (www.wfmc.org) DSM (Design Structure Matrix), IDEF (Ross, D. T. "Structured Analysis (SA): A Language for Communicating Ideas," IEEE Transactions on Software Engineering, vol. SE-3, No. 1, pp. 16-34, 1977) and OPM (Object Process Model). However, intrinsic drawbacks of the work-centric process model include the following:

It is difficult to understand, make changes and customize—a fact that is recognized through implementation of any solution with an underlying work-centric process model.

The assumption that any business process can be represented by an explicitly described network with regular connections between activities is incorrect. Most real processes are far more scaleable, disconnected, not well structured, and cannot be wrapped in an aligned logical form and therefore do not yet have a good IT (Information Technology) solution.

The work-centric process model is focused on activity and does not provide details relating to processing data. Input/output data serves here as reference information for an activity or events to control, but not as data content. This does not allow existing integration technologies to be fully leveraged, such as in messaging, data connectivity, and data transformation.

Business process integration (BPI) becomes a real challenge, where the entire process cannot be described explicitly and without disconnected activities. That is why BPI is successfully implemented only in fields such as STP and Web Portal management, where an entire process is fully automated or well committed.

Integration of an automated (software-driven or structured) process with a collaborative (human-driven or unstructured) process is not possible using the workflow model, as well as process monitoring at an instance level, while BPM (business process management) tools monitor a process at a macro level (KPI—Key Performance Indicators—via Dashboards).

As an alternative to a conventional work-centric process monitoring system that can offer a solution to the above-mentioned drawbacks, a data-centric process monitoring system, in accordance with an embodiment of the present invention, is provided. A set of triads such as <Incoming message, Entity, Outgoing message> typically constitute building blocks of this embodiment of the invention. This embodiment enjoys the following advantages, in comparison with conventional work-centric process models: focus on data (an activity serves only as reference information for a data transformation), flexibility with regard to changes because it does not involve business logic, high reliability because data content is far more reliable than activity or process logic, and no challenge for BPI since two triads may be integrated within one process. In contrast to work-centric methods, a message based BPM (business process management) such as that shown and described herein does not necessitate a connection to business applications or IT (Information Technology) services, nor does it require process understanding. In certain embodiments of the invention, only messaging systems that carry messages or content are necessary. Today, three different types of such systems are known: content-routed networks, message brokers and content management platforms.

Content-routed networks are described in A. Carzaniga, M. J. Rutherford, A. L. Wolf, in "A routing scheme for content-based networking", Department of Computer Science, University of Colorado, June 2003. A content router may be a digital communications networking device which forwards content based on inspection of the content of a message or document, rather than on an explicit destination address in the networking header of a packet or frame. An example of a content router is the 3200 Multiservice Message Router from Solace Systems, Inc. Content routers have connections between themselves so that they can both communicate with each other and also exchange information needed to control the network, as well as carry the content received from publishers from one content router to the next, to deliver it to the subscribers in a network interested in the content.

Message brokers may be software applications that implement Publish and Subscribe mechanisms as an effective way of disseminating information to multiple users. Business applications and services connected to a particular message broker are typically written so that a "community" of clients with a common purpose enables them to send and receive messages among themselves. A message broker may be an intermediary acting between publishers and subscribers and is known as a coupling and a loose coupling. The latter is also known by the name Enterprise Service Bus (ESB). A message broker may save (in a separate repository and files) all the message-class definitions and registers each transported message-instance in detail, including its publisher and subscriber.

Content management systems typically address to store (archival), index, and retrieve different unstructured documents in structural XML form for querying and searching. To put or review a document in the archive, these systems may use workflow-based BPM (business process management), but for query and search purposes they may create and use repositories with document type definitions and content attached to each received document.

An embodiment of the present invention may use the existing messaging systems mentioned above in a form and for a purpose that BPM (business process management) tools have hitherto not been used, due to lack of synergy between workflow-based BPM (business process management) and messaging systems.

The term "overall business process" is intended to include a true business process which starts with the first event that initiates a course of action, which is not complete until the last aspect of the final outcome is satisfied from the point of view of the stakeholder of the first event that triggered the course of action. Instead of a transactional (crosses single IT (Information Technology) system or business application) and an end-to-end (crosses several business applications across an enterprise) business process, the overall business process may cut across organizational structures, geographies, and technologies. The overall business process may comprise software and human driven activities (unstructured business processes), usually disconnected from each other. A method of monitoring of an individual overall business process provided in accordance with an embodiment of the invention may use a content-routed network, message brokers (coupled and loose coupled), and content management platforms to get messages and may provide a message tagging mechanism to correlate an executed message-instance with an initial process-instance.

Embodiments of the present invention may provide a method for control and monitoring an individual overall business process using the messaging systems that collect message-instances in the format like XML by using a subscriber mechanism or query method, or any database adaptor.

An embodiment of the invention may include a method for message-based monitoring including message meta-tag definition; a method for assigning message-instance to process-instance; or, in other words, process-instance identification through message-instance content.

An embodiment of the present invention seeks to provide an improved system and method for monitoring business processes, typically including monitoring of a process across multiple message-handling systems. Methods can typically be applied to any long running process. Optionally, the system may have a data centric view on the process—examining only data and not the meaning of the each activity in a process instance. Based on data centric process representation the system may provide message to process instance correlation based on message data only, using ID fields and individual field weights.

An embodiment of the present invention also seeks to provide a system for control and/or monitoring of business processes which cross different IT systems, services and business applications, connected or disconnected, and/or collaboration between human users (human-driven or unstructured processes). All such processes are included in the term "overall business process" employed herein.

According to an embodiment of the present invention, a plurality of business processes or data-generating systems, which are not electronically integrated, are used for input. Minimal integration is typically required in the data centric solution vs. very hard and long integration in the workflow based solution. Non-intrusive view capabilities are preferably provided. Monitoring of the processes is typically performed only in key places. A messaging platform (e.g. middleware) is typically used for controlling and monitoring a business process that crosses different information systems (connected and disconnected), human driven activities (collaborative processes) and organizations.

The system typically can accommodate any organization of any size and industry which produces and sells or/and purchases products or/and services and uses for these purposes an information system (such as ERP, CRM and SCM) or/and a middleware infrastructure (such as WebSphere, WebLogic Integration or Aqualogic), or/and a content management platform (such as EMC Corporation's Documentum system), or/and a content-aware routing system (such as SolaOs), or, at least, an email service (such as Outlook or Gmail), e.g. any small organization or industry which produces and sells or/and purchases products or/and services using the small ERP system AccPac of Sage Group.

Optionally, Process model definition is implemented, the new process model type being termed herein content or Data Centric Process model (DPM), an embodiment of which is characterized by being based on analysis of messages being exchanged by entities within an organization in which a business process to be monitored is occurring. Usually in the field of Business Process Management a work-centric process model named Workflow, is used. A comparison of certain aspects of embodiments of the invention and the prior art is shown in FIGS. 1A-1B. The workflow model focuses on activities that are business-related or technical tasks to run such activities. In the system of the present invention, typically, the focus is on Data that is transferred between IT (Information Technology) systems or/and between people, or/and between the IT (Information Technology) system and a person for decision making.

The system of the present invention may be characterized by some or all of the following:

1. Data centric process model—enables examining only messages (content) that are produced during true long-running business process execution by IT (Information Technology) systems and people to track and monitor each single business process from its inception to closure, such as an overall business process related to dealing with a supplier.

2. A method for creation of a data centric process model without the need to build and understand the entire process workflow.

3. A message-to-process instance correlation mechanism, which provides precise information on the state of a single process that a message-instance belongs to (current processing and completed business activities, stage of a current process, etc.).

4. Message-to-process instance correlation method enabling based on data content and data-centric process model only, using meta-tag data fields and its weights.

5. Process correctness validation method enabling control each individual business process to be executed accurately using messages only provided with adaptors to structured data sources (message brokering tools, JMS or Database) and non-structured or semi-structured (content management platforms, email services) data sources.

6. Overall business process control and monitoring method and system using only Message Brokers or ESB (Enterprise Service Bus) and data-centric process model without process coordination and orchestration.

7. Data centric view on the process—examining only data and not the meaning of each activity in a process instance.

8. Message to process instance correlation based on message data only, using ID fields and individual field weights.

A particular advantage of an embodiment of the present invention is that the system may be set up easily as a function of information easily supplied by low-level IT employees of an organization (information about the flow of messages within the organization's subsystems) whereas as conventional business process monitoring systems require input from senior level employees of the organization and understanding of business process logics.

There is thus provided, in accordance with an embodiment of the present invention, a system for monitoring a business process involving a plurality of workstations or/and processes, the system comprising an apparatus for receiving messages exchanged between the plurality of workstations or/and processes and having content, and for deriving from the content of the messages, monitoring information regarding the business process.

Further in accordance with an embodiment of the present invention, the apparatus for receiving and deriving comprises apparatus for recognizing at least one of the following types of messages: a purchase order, an invoice, and a shipping receipt.

Still further in accordance with an embodiment of the present invention, at least one of the messages comprises a message having an EMC Documentum format, JMS format, SOAP format or SQL format.

Further in accordance with an embodiment of the present invention, the monitoring information comprises fraud control information.

Still further in accordance with an embodiment of the present invention, the apparatus for receiving and deriving comprises a queue of messages in the predefined format like XML.

Additionally in accordance with an embodiment of the present invention, the apparatus for receiving and deriving operates without resort to a definition of the workflow of the business process.

Further in accordance with an embodiment of the present invention, the apparatus for receiving and deriving comprises an apparatus for differentiating between organization-customer portions of the business process which generate income for the organization and supplier-organization portions of the business process, which require expenditure from the organization.

Also provided, in accordance with an embodiment of the present invention, is a business process monitoring system for monitoring a business process being carried out by an organization including at least one organization entity, each of which receives incoming messages and generates outgoing messages, the system comprising apparatus for storing information, characterizing the business process, the information including a plurality of triads, each triad comprising at least one characteristic of an incoming message, at least one characteristic of an outgoing message and at least an indication of an entity which receives the incoming message and generates, responsively, the outgoing message; and apparatus for monitoring the business processing by processing the plurality of triads.

Further in accordance with an embodiment of the present invention, the incoming message includes at least one of the following: a document in a predefined state, a scanned document, a middleware message, an SMS message, DB record, textual file, e-mail, fax, HTTP page.

Still further in accordance with an embodiment of the present invention, at least one entity comprises at least one of the following: a computerized business application, an IT (Information Technology) service, a department, an employee.

Additionally in accordance with an embodiment of the present invention, the apparatus for monitoring is operative to detect suspected occurrences of at least one of the following events:

errors in keying in data, double payment, bypassing at least one process defined as mandatory by an organization; alteration of payee; purchasing for personal gain; return of purchased item while retaining the purchase price thereof.

Further in accordance with an embodiment of the present invention, the data comprises at least one of a check, a voucher, and a depreciation record.

Also provided, in accordance with an embodiment of the present invention, is a method for monitoring a business process involving a plurality of workstations or/and computerized services, the method comprising receiving messages exchanged between the plurality of workstations or/and computerized services and having content, and for deriving from the content of the messages, monitoring information regarding the business process.

Further in accordance with an embodiment of the present invention, receiving and deriving comprises recognizing at least one of the following types of messages: a purchase order; an invoice; a shipping receipt. Also provided, in accordance with an embodiment of the present invention, is a method for detecting fraud comprising building a data centric process flow network and monitoring at least one business process having an inception point marking its beginning and a closing point marking its end, from the inception point to the closing point, the business process including messages, the monitoring including analyzing at least one current message, belonging to the business process and having content including at least one data field, relative to at least one previous message belonging to the business process and having content including at least one data field common with the current message, including comparing values of the at least one common data field between the current and previous messages.

The terms "Transaction" and "Process instance" are generally synonymous. The terms "Junction", "network node", "message class" and "node" are generally synonymous. The terms "Message" and "message-instance" are generally synonymous. The term "business route" and "route", and "triad" are generally synonymous. The terms "meta-tag field", message data field and "logical name" are generally synonymous. The terms "computerized representation of a process" and "process definition", and "data centric process model", and "process flow network" are generally synonymous. The terms "Analytical engine" and "Correlation engine" and "Process rule engine" and "Engine" are generally synonymous. The terms "IT system, service and business application" and "computerized services" are generally synonymous.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

Any trademark occurring in the text or drawings, such as but not limited to terms marked with an asterisk, is the property of its owner and occurs herein merely to explain or illustrate one example of how an embodiment of the invention may be implemented.

BRIEF DESCRIPTION OF THE DRAWINGS

Certain embodiments of the present invention are illustrated in the following drawings:

FIG. 20 is a simplified flowchart illustration of a rule execution method applied to a current message for detection of error in keying in data, the method being constructed and operative in accordance with certain embodiments of the present invention;

FIG. 21 is a table of relationships between specific alerts and ARM (Alert Resolution Manager) actions, and between specific rules, all in accordance with certain embodiments of the present invention;

FIGS. 23A-23D, taken together, form a table illustration of properties of each of the business process nodes of FIG. 5; this information may be stored in the process definition database of FIG. 6, in accordance with certain embodiments of the present invention;

FIG. 24A is a simplified diagram of an example of a suitable data structure for the process definition database 635 of FIG. 6;

FIG. 24B is a simplified diagram of an example of a suitable data structure for the message queue database 620 of FIG. 6.

DETAILED DESCRIPTION OF PREFERRED EMBODIMENTS

Figure 1A:
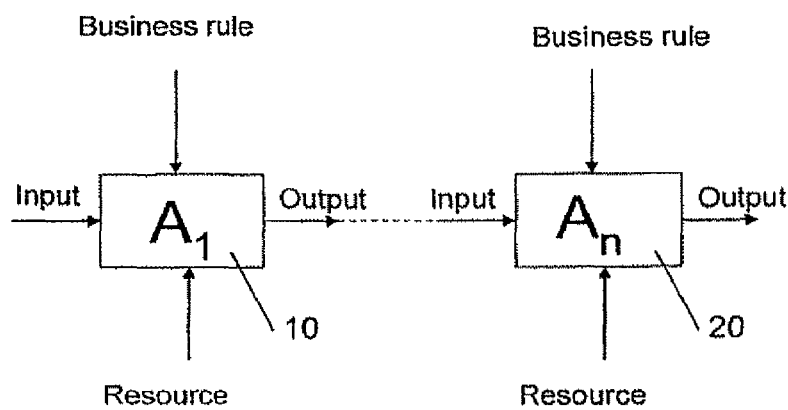
FIG. 1A is a simplified diagram of prior art workflow-centric monitored business processes.
Figure 1B:
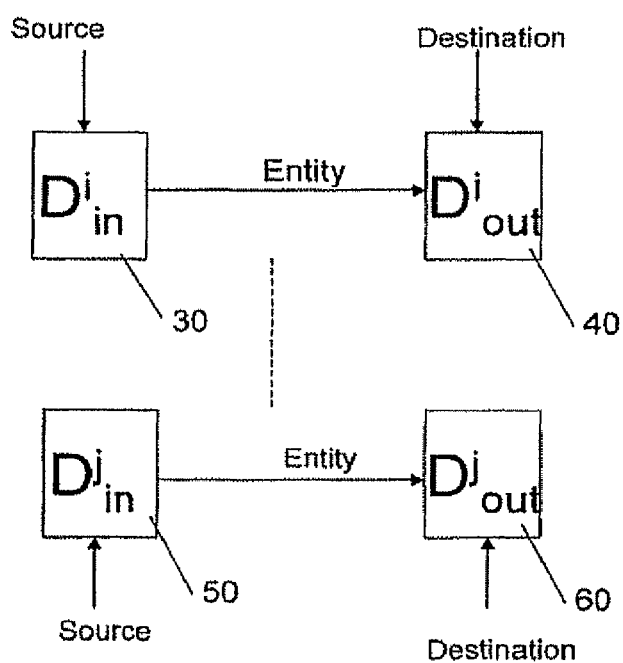
FIG. 1B is a simplified diagram of data-centric monitored business processes including a plurality of triads representing business routes, each triad typically comprising an incoming message, an entity which receives it, and an outgoing message generated by the entity responsive to receipt of at least the incoming message.

As an alternative to a conventional work-centric process monitoring system e.g. as shown in FIG. 1A, that can offer a solution to the abovementioned drawbacks, a data-centric process monitoring system, in accordance with an embodiment of the present invention, is shown in FIG. 1B. The "data" in the data-centric process model may include a document in a predefined state, a scanned document, a middleware message, an SMS message, DB record, textual file, e-mail, fax, HTTP page and so on. An entity in the data-centric process model may include a business application, IT (Information Technology) service, department, employee's role and so on, that transforms the incoming message into an outgoing message.

The techniques used may be entirely different from those used in a work-centric business process design and analysis. Triads may be connected to each other in the network through their Incoming and Outgoing message content in XML form or alike. The linkage between messages typically ensures feasible conditions for processing instance identification using part of a message content called a meta-tag. Before launching the method for a meta-tag definition for each type of overall monitoring processes (customer-centric, supplier-centric or alike) a Meta-tag Spec is typically defined which may comprise a file or database table that may comprise all possible data field names enabling an identity for a specific object like customer or supplier at different steps of process execution. Examples of data fields which may be included in a Meta-tag Spec for a buying overall business process (supplier-centric system) are: Supplier name, Supplier URL, PO date, PO number, Invoice number, Invoice date, Product name, and Shipping order number.

Figure 2:
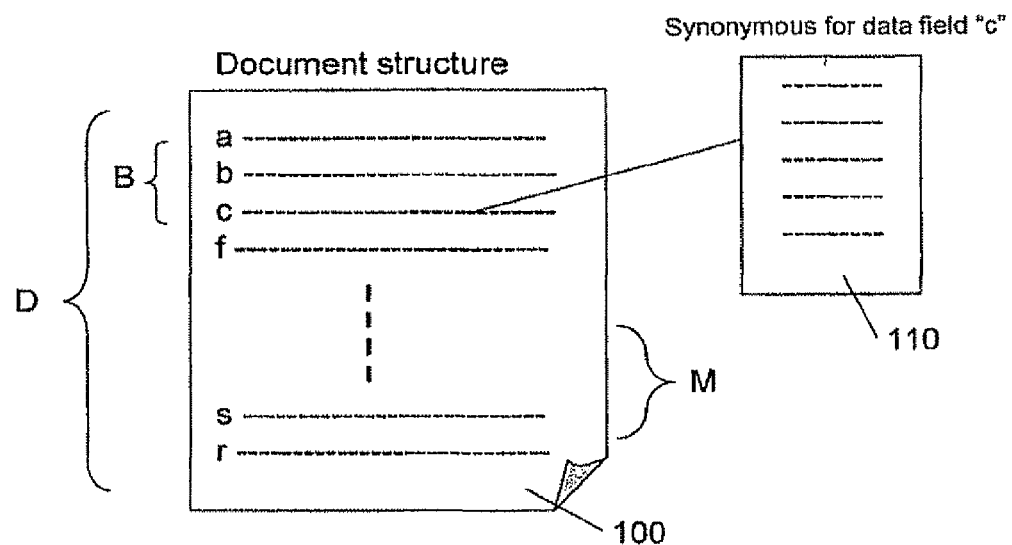
FIG. 2 is a diagram of a message including information which may be stored as a node e.g. in any of the nodes in the computerized representation of a buying process to be monitored shown in FIG. 5.

An embodiment of the present invention employs a simple non-directed or directed graph, built by using the triads described above. Nodes of the graph are message-classes produced during as-is overall business process execution. The content of every message (structured or unstructured) may be marked as illustrated in FIG. 2 in which: a, b, c, f, s, r—data fields; B—message meta-tag; D—all relevant data fields; M—data fields existing in Meta-tag Spec (in addition to B). Every triad has a certain meta-tag B, which is applied to each of its messages: both boundary (incoming/outgoing) and those that divide the triad into two or more triads relating to the same entity. The method works to automatically define the meta-tag for each message and connects the triads in the content-based process network (graph). To define B, an XML scheme of the two triad's messages may be obtained and data fields that are available both in each of the messages and in the Meta-tag Spec are found. The data fields (names) found synonymously may form the meta-tag B for each message related to the given triad.

The triads may be extracted from operational message brokers or content-based network routers, as described below. A message brokering mechanism typically requires the following model definition: <input message (content)—subscriber/publisher—output message (content)>. In addition, the input/output message transformation model may be defined. The information about these models remains in a special configuration file and may be extracted from the file automatically. As the name of the configuration file is known to the user, he merely scans the enterprise domains and to identify various operational middleware product configuration files.

After data has been extracted from the configuration files, it may be transformed to triads as follows:

<input message—app/ . . . —?????>
<????—app/ . . . —output message>

The result after extraction of a fragment as described herein may be completed by an IT (Information Technology) expert (preferably not by a business analyst), or by receiving new information extracted from other operational message brokers. This method may add the output message to the first triad and the input message to the second triad.

The following example demonstrates how the triad generation method described above may operate in an example enterprise: Assume that an enterprise has a 'Handle Payment' computerized application that is responsible for handling and preparing payments to subcontractors and suppliers. It also has an operational middleware infrastructure that connects that application to a web-based application using two message brokers (routers). The 'Handle Payment' application receives an 'Invoice' incoming message from a router, and, after finishing its role, it forwards an 'Approved Payment Voucher' (outgoing message) by another router towards the next application (Web Service2). For simplification, assume that all messages are XML data. After extracting data from the operational routers, the following triads are obtained:

<Invoice—'Handle Payment'—Approved Payment Voucher>
<????—'Web Service1'—Invoice>
<Approved Payment Voucher—'Web Service2'—99999>

Additional scanning of enterprise domains by an IT (Information Technology) expert may complete the above triads by introducing the following messages: Purchase Order and Payment. As a result, the following triads are obtained:

Triad 1: <Invoice—'Handle Payment'—Approved Payment Voucher>
Triad 2: <Purchase Order—'Web Service1'—Invoice>
Triad 3: <Approved Payment Voucher—'Web Service2'—Payment>

Meta-tags may be defined for the above 3 triads respectively, comprising the following data fields respectively:

$1^{st}$ triad: supplier name, ordered items, total sum, invoice date or number $2^{nd}$ triad: supplier name, PO date or PO number $3^{rd}$ triad: supplier name, total sum.

Figure 3A:
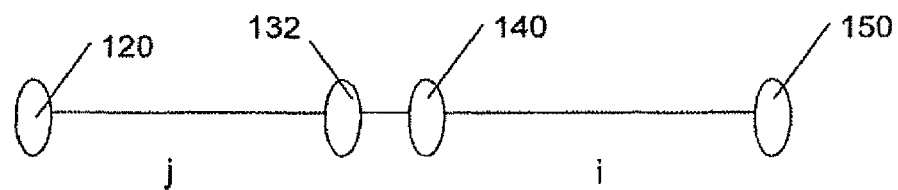
FIGS. 3A-3B are simplified illustrations of triads and connections therebetween, in accordance with certain embodiments of the present invention.

Two triads (FIG. 3A) j (formed by $D_j^{in}$, $D_j^{out}$ pair) and i (formed by $D_i^{in}$, $D_i^{out}$ pair) are typically connected if the meta-tag in an incoming message of route i ($D_i^{in}$) partially comprises or entirely comprises content B and M of outgoing message of route j ($D_j^{out}$) as shown in FIG. 3A.

Figure 3B:
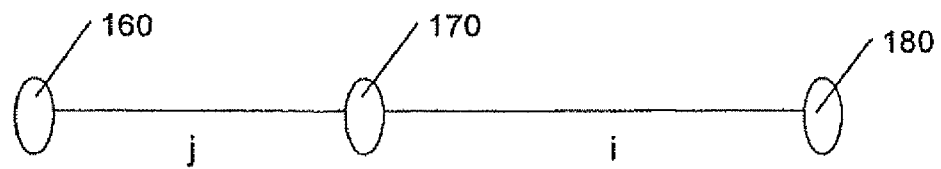

If the name of an outgoing message of route j is the same as an incoming message name of route i, the above connection is typically represented as in FIG. 3B. Typically, the message broker or/and router configuration files are not the only way to extract triads. For this purpose any XML message definitions stored in an operational system could be used. For example, if an operational system is built in Service Oriented Architecture, triads might be extracted from BPEL (Business Process Execution Language), WSDL (Web service Description Language) and the like.

Thus, a set of triads may be generated which is connected to a content-based process flow network as described above. Following this, a new message (additional model node) is received. To insert this message into the triad structure generated, the following method A may be used which may include the steps shown below, suitably ordered e.g. as shown below:

Method A

Step 1. Find a triad, whose meta-tag is involved in the content of new message.

Step2. Check whether the new message has data fields that are not available in an incoming message but are available in an outgoing message of the found triad. If true, then assign this message to the triad as a mid message (node). If false, go back to step 1. After finding all the triads as above, go to Step3.

Step3. Look for an entity that produces this message and build the new triad or fix this message content and go to Step1.

The two first steps of the described method may be automatically performed and may be used for extending the predefined process network "on-the-fly". This is particularly relevant for an unstructured (collaborative or human-driven) process. For instance, a portion of an insurance claim handling process may be represented by the following triad:

<list of received claimant's documents, claim department, letter reporting pay/don't pay decision>

For example, an insurance clerk reviews the received claimant's documents in the document management system and decides (before making a decision to pay or not to pay) to request an additional document of the claimant. The probability of such a request may be 1:1000 but it may occur and therefore this fact has to be reflected as evidence for an individual claimant audit trial. Thus, a new message "Additional request" that does not exist in the predefined process model, is received. The request is sent to the claimant by email that is archived in the Content Management System. This example is discussed further below, in a description of the process monitoring method.

Figure 4:
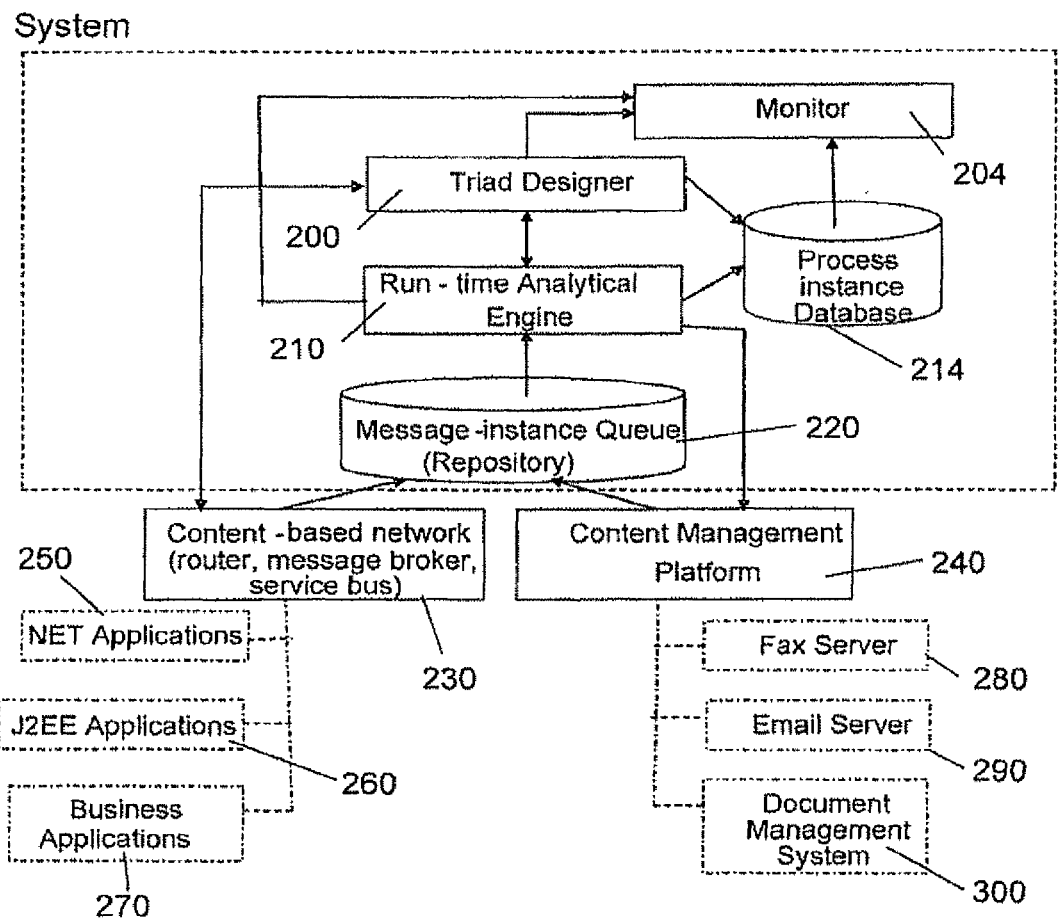
FIG. 4 is a simplified functional block diagram illustration of a data-centric system for monitoring business processes, constructed and operative in accordance with a first embodiment of the present invention.

A method for overall business process monitoring according to an embodiment of the invention is described below. A system that may apply this method is shown in FIG. 4. The system may comprise a Triad designer, Runtime analytical engine, a Monitor that presents different reports, a Separate XML Message queue repository and a resulting Database that stores all executed messages for each individual process in accordance with an embodiment of the present invention. The system typically overlays the above operational content-based operational networking (routers, message brokers and ESB (Enterprise Service Bus)) and ECM platform.

As part of the messages defined using a designer, as described above, further messages may be received from structured data sources such as an ESB (Enterprise Service Bus)/message broker via publisher/subscriber mechanism. The rest of the messages defined in the system which are related to unstructured data sources such as email, fax, or a scanned document, and stored into an ECM platform may be received by a query that may comprise a meta-tag data field value created during system functioning. All relevant messages ESB (Enterprise Service Bus), for example and ECM products are delivered to the removed message queue repository to which the Runtime analytical engine (Engine) is connected.

An engine that applies a method provided in accordance with an embodiment of the present invention may receive a message from the Message Queue Repository and may examine it to identify a node to which the message relates. It finds among the received messages in the Database the message related to an adjacent node with the same meta-tag data value, attaches the Process ID (PID) already available in this message to the current message, and puts it into the Database.

There are two or more variations of the method as described in detail herein, each variation including the steps described below, suitably ordered e.g. as follows:

Method B

Step1. Get a current message from the Queue and identify a node. Go to Step2

Step2. Look for the same meta-tag data value in the previous nodes available in the DATABASE.

If the node and message are found, perform step 2.1.

If the node is found but the message is not found, perform step 2.2.

If the node is not found (e.g. the node of current message is the first in the node structure generated by the system), perform step 2.3.

2.1 Attach the Process ID existing in the found message within Database to the current one. In other words, link the current message to the found in DATABASE process-instance record. Go to Step3

2.2 Send alert "Bypass the process or error" and wait for a response from the person responsible. If "Bypass the process" is approved, then make up the new process-instance record in the DATABASE—new Process ID may be established—with the current message as the first node the process-instance is started from. Otherwise, keep the Alert remained valid. Go to Step3

2.3 If the same Purchase Order number (PO number) value (both refer to supplier-centric embodiments) is found in the DATABASE, then alarm "Error in PO number". Otherwise make up the new process-instance record in the DATABASE (generate new Process ID and glue it to the current message). Go to Step3

Step3 Get next message from the Queue and go to Step1.

Method C

Step1 The same as in the Method A. Go to Step2

Step2 The same as in the Method A. Go to Step3

Step3 Generate a meta-tag based Query to search all messages in the Queue related to the next adjacent nodes.

Two possible results are as follows:

At least one message is found, in which case step 3.1 is performed, or

No message is found, in which case step 3.2 is performed.

3.1 Perform Step1 and Step2 for each of the found messages. At the end of each cycle extend (or change) Query for Step3. Do Step3 with new Query. At the end, go to Step1.

3.2 Go to Step1.

Method C is active and Query driven, whereas Method A is passive in that it serves messages from the queue one by one.

A method for inserting a new node "on-the-fly" as was described above in the example of insurance claim, extends Step2 in both methods by the new situation: The node is not found while a process-instance is identified through the content of the current message e.g. at least one message, whose meta-tag comprised the data value of the current message, is found in the Database. The method may find all triads involving each found message and may then perform Steps 1 and 2 of Method A described above, for each triad.

In some cases the Message queue in FIG. 4 may be replaced by the message repository (registry) that an ESB (Enterprise Service Bus) or/and ECM product builds while transporting messages or by performing a document storage process.

A process control method may be based on the above-described process monitoring method but may be extended by introducing business rules to detect an exception such as but not limited to an error in data typed into a business application, or fraud. A list of application-specific rules may be pre-defined in a design stage. Each rule may be applied for certain data involved in message content. A rule sets up the relevant message content, e.g. the list of relevant data fields in addition to those that are used in meta-tags for process-instance identification. An example of a generic rule that uses an ability to monitor overall business process-instance is as follows: "Sensitive data such as supplier name, payable sum, supplier address, ordered goods and amount, should have the same value in any message produced during process fulfillment". Another rule example is as follows: "For each PO there should be only one Invoice for the same total sum".

Evidently, the body of a rule comprises data fields and message (node) names. Therefore, each rule may be applied to the message, so that a list of predefined rules may be attached to each node. The same rule, however, may be attached to more than one node. These rules may be applied in Step2 of the described process monitoring methods while the current message-instance is put into the Database by comparing the relevant data fields with those that are already available in the Database for the same process-instance (the same Process Instance ID).

The ability to control and monitor the individual process through disconnected IT (Information Technology) systems and human-driven activities, as described above, may be used as the underlying platform for creation different solutions (applications) in different fields of business (known also as Content Enabled Vertical Applications—CEVA), such as an overall selling process, an overall buying process and an overall insurance claim handling process. Because every solution may be dissimilar in the data-centric processing model that it uses, described below is a solution based on a data-centric process model for an overall buying process.

Figure 5:
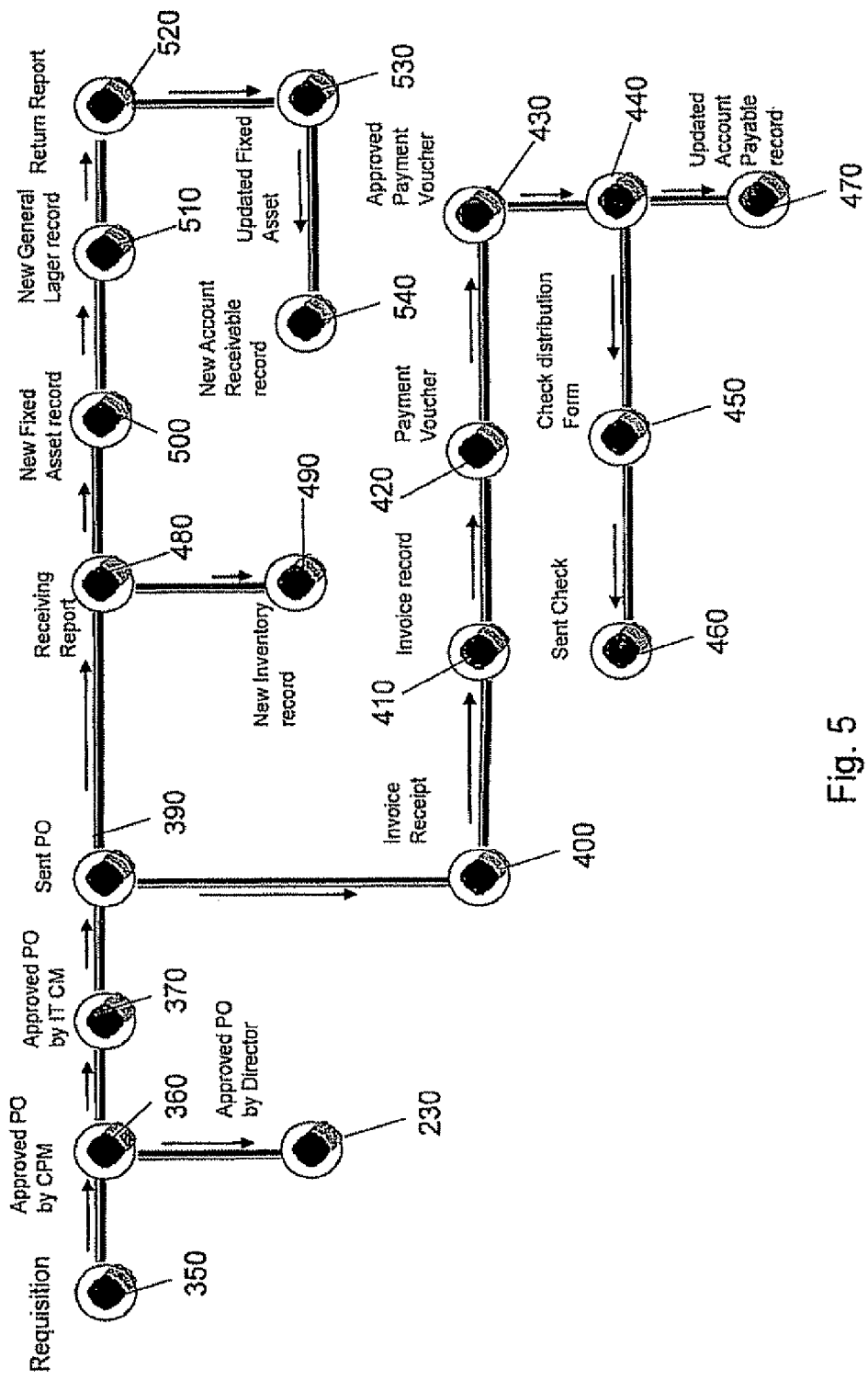
FIG. 5 is a simplified diagram of an example of a computerized representation, generated by any of the systems shown and described herein, of a buying process to be monitored by any of the systems shown and described herein, the representation typically being generated by interconnecting triads, all in accordance with certain embodiments of the present invention.

A computerized representation of a buying process in accordance with an embodiment of the present invention, useful in monitoring the buying process, is shown in FIG. 5. The representation of FIG. 5 enables a user to control and monitor processes related to a specific supplier (supplier-centric monitoring) through Purchase Order (PO) initiation (Requisition), approval, payment, registration of the ordered goods into relevant enterprise systems and a return process if ordered goods do not fully satisfy a customer. Generation of the computerized representation of FIG. 5 is useful in identifying the following insiders' risks: errors in data typing (check, voucher, depreciation, etc.); double payment; bypassing the process; altered payee; purchasing for personal gain; return purchased item and keep the cash as described in detail below.

1) Errors in data typing: the system controls that a certain data field, available in more than one message, has the same value. For example, the total sum that is recorded into the Depreciation system (New Fix asset record message), in the Payment system (Payment Voucher, Approved Payment Voucher and Signed Check messages) and in the sent check (Check sent message), is the same.

2) Double payment: the system controls that since an invoice has already been received and correlated to an initial PO, the current message that it gets is one more invoice (two or more Invoice Receipts or/and Invoice Record messages are correlated by the system into one Sent PO message).

3) Bypass the process: the system controls that an invoice from a supplier (Invoice Receipt message)cannot be issued before the approved PO has been sent (Sent PO message).

4) Altered payee: this refers to errors in data typing by controlling a name of a supplier.

5) Purchasing for personal gain: this refers to errors in data typing by controlling the amount of the ordered items (the system controls every message that includes this data field until the message "Return Report" is received).

6) Return purchased item and keep the cash: the system controls this by receiving a message "Return Report" before messages "New Fixed Asset record", "New General Lager record" and "Account Payable record" is updated in accordance with "Return Report" and new message "Account Receivable record" is produced in financial applications.

Referring again to the system of FIG. 4, the system may comprise the 3 functional boxes and 2 data storage units shown:

Connectivity with operational IT (Information Technology) infrastructure: Content-based networks (router, message broker, service bus) e.g. SolaOs, and Enterprise Content Management (ECM) platforms should be provided. Triad Designer—applies an absolutely different process modeling method that results in Process Definition XML file in accordance with new data-centric process model structure. In addition, this box allows a user to map model data junctions' and data fields' logical names into native data fields' names of operational systems.

Analytical Engine—monitors and controls a single overall business process based on message-to-process correlation method and alerting.

Monitor—visualizes results of control and monitoring providing organizations with reports and dashboards.

Message Instance Queue—incoming to Analytical Engine.

Process-Instance Database—outgoing from Analytical Engine.

A possible data flow between the system components of FIG. 4 is as follows:

1— XML "Process Definition" file from Triad Designer to Analytical Engine and all available native names of junctions and fields are fed into an Adaptor from Analytical Engine to triad Designer.

2— Mapping results made in triad Designer from Analytical Engine to connectivity and all available operational IT (Information Technology) systems, native names of junctions and fields from connectivity to Analytical Engine.

3— Message-instance arrives at the Message Queue from Content management platform and Content routing (brokering) network.

4— Message-instance arrives at Analytical Engine from Message Queue.

5— Message-instance correlated with a single business process by Analytical Engine is inserted into its Process instance database. An example of the message is shown in the FIG. 5.

6— Data to be used for reporting by Monitor arrives from Process instance database created by Analytical Engine.

Figure 6:
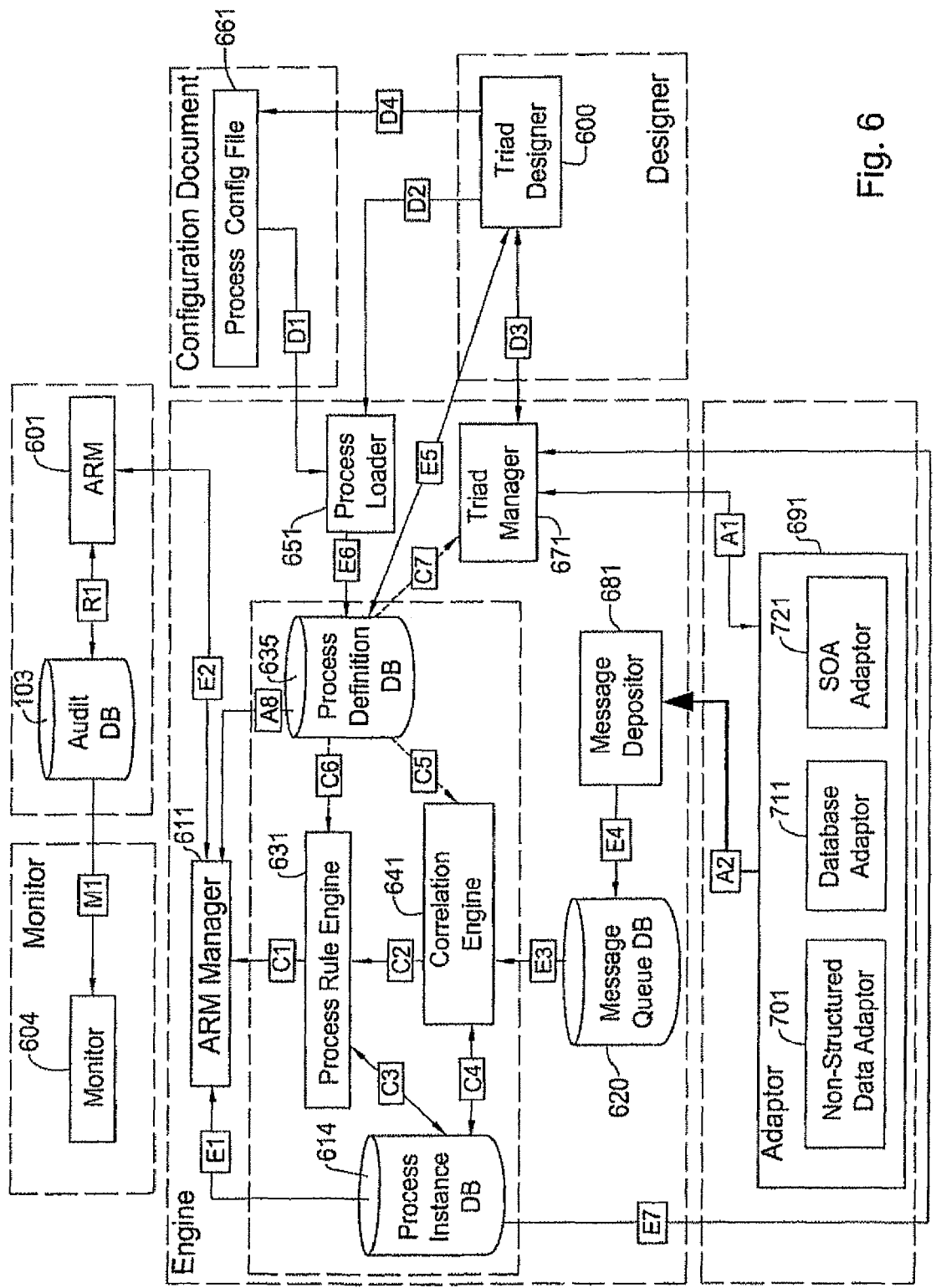
FIG. 6 is a simplified functional block diagram illustration of a data-centric system for monitoring business processes, constructed and operative in accordance with a second embodiment of the present invention.

FIG. 6 is a simplified functional block diagram illustration of a data-centric system for monitoring business processes, constructed and operative in accordance with a second embodiment of the present invention.

The system of FIG. 6 typically includes one, some or all of the following blocks: Monitor—typically allows for examination of any audit trail data. Example: Corporate manager view, Line manager view and Auditor view. The access to the data is typically 'read only' but data is available in real time and support of historical queries is provided.

Audit Database—typically contains audit-trail data regarding all of messages, alerts and alert resolutions that have been processed by the Engines and ARM (Alert Resolution Manager).

ARM—Alert Resolution Manager—typically operative to receive all of messages and alerts from the engines. If a message contains an alert, the ARM (Alert Resolution Manager) typically notifies a human operator and/or tries to resolve the alert. An ARM (Alert Resolution Manager) typically retains a full trail and all documentation relevant to resolution. Such information may be relayed to the Audit Database for further analysis by the Monitor.

ARM (Alert Resolution Manager) Manager—responsible for registration of new ARM (Alert Resolution Manager) and relaying of the messages to the appropriate ARM (Alert Resolution Manager) that registered with each process ID (the process type monitored by the monitoring system).

Process Definition Database 635—This database may store all of the process information: junctions (message-classes), fields, routes, rules, alert types, scopes, ID fields, field weights.

Process Rule Engine—responsible for running all of the rules defined in a process to validate process correctness during execution. If a rule applies, an alert may be generated and stored in the Process Instance Database.

Process Instance Database 614—This database may store all messages, process instances and process instance IDs.

Correlation Engine—responsible for correlation of a new message to the process instance. If the message cannot be connected to the process instance, a new process instance may be created.

Process Loader—This component may process incoming configuration files and convert them for storage in the Process Definition Database; then it may create/update process definition.

Process Config File—typically an XML Document with predefined (built-in) full process definition.

Triad Designer 600—software which typically allows creation of a triad structure from scratch, or updating existing information in the process configuration files' predefined triad structure in accordance with conditions of particular customer. Typically, the Triad designer generates, in memory, a message-based representation of the business process (network) to be monitored as a plurality of interconnected business routes.

Adaptor Manager—may communicate with all adaptors during runtime to make sure they are up and connected. It may also provide information to the node Designer regarding configuration and data from one or many adaptors. The Adaptor Manager may reference the Process Definition Database for any process or junction related information.

Message Depositor—may get all messages from adaptors, in native format (message names and field names may be native), convert native names of specific organizations into logical names familiar to the system of FIG. 6, and deposit the message into the Message Queue Database, marked with a particular process ID (process type)

Message Queue Database—may store all of the message queues that are to be processed by the Correlation engine. These messages typically do not have a process instance tag attached to them at this point.

Adaptor—facilitates communication between plurality of adaptors, the Adaptor Manager and the Message Depositor.

Non-Structured Data Adaptor—adapts to Non-Structured data sources using ECM platforms, such as EMC Documentum or email services such as Gmail and Outlook Database Adaptor—means an adaptor to any database, and typically uses a previously created trigger in a given database that may signal the presence of new data. Once the trigger has given this signal, the adaptor may retrieve it to build and send a message in standard format, such as XML. The Database Adaptor is also typically able of discovering of all possible data sets available in a given data source, this information representing the native message and field information used by the Designer for purposes of mapping.

SOA Adaptor—This component represents an adaptor to any service bus or Message broker and assumes that access is provided via WSDL, and uses subscriptions to filter which messages to collect and send to the Message Queue Database. The SOA Adaptor is also typically operative to list all available messages with native message and field information.

A possible data flow between the system components of FIG. 6 is as follows:

A1—Adaptor may register with the Adaptor Manager providing appropriate credentials and optional encryption parameters.

Adaptor may provide, if asked by the Adaptor Manager, a list of all native messages and fields that are available.

Adaptor may send configuration of the native filter/subscriber.

Adaptor Manager may send the request for all native messages and fields.

Adaptor Manager may send configuration for the Adaptor's filter to specify only a subset of the native messages and fields that are relevant.

A2—Adaptor may deposit messages in the Message Depositor via SOAP (XML). The format of the message may be given by CFMessage schema. Each message may contain the process ID, message name (junction name) and set of all fields relevant for message correlation (process instance the message belongs to identification) and process correctness validation.

A4—The Message Depositor may put all the messages that come from the Adaptor into the Message Queue Database by converting every message field given in a native name to its logical name.

C1—After all of the Rules have been applied and all of the Alerts have been found, a copy of the message and any alert associated with this message may be sent to the ARM Manager.

C2—After Process Instance Correlator has completed correlation, a message is sent to the Process Rule Engine, so that Rules can be applied.

C3—When a Process Rule Engine works on a message, it uses other messages from the same process instance for comparison and rule-based validation. Any found alerts may be stored in the Process Instance Database.

C4—When the Process Instance Correlator works on a message, it may use the Process Instance Database for correlation to the process instance. Any correlated messages are stored in a Process Instance Database.

C5—When the Process Instance Correlator works on a message, it uses the Process Definition Database to look up junction, field and weight information about a message.

C6—When the Process Rule Engine works on a message, it uses the Process Definition Database to look up rules defined for the particular process.

C7—The Adaptor Manager may receive a process definition to configure the adaptors.

D1—Process Config File is typically an XML configuration document that has a full Process definition. It may be loaded into a Process Loader to add new process definition, or may be used for back-up purposes.

D2—The triad Designer may create a new process definition, an XML configuration document, into Process Loader.

D3—The triad Designer may query the Adaptor Manager to provide information on one or many available adaptors for a particular process ID. The Adaptor Manager may send requested information to the triad Designer, including all native message and field names.

D4—The triad Designer gets the Process configuration document for updating and data mapping.

E1—Process Instance Database may provide the ARM Manager with all data that is to be sent to the ARM typically including: process instances, messages and alerts.

E2—ARM may register with ARM Manager and provide authentication information, process ID it is interested in listening to, and a location where the messages may be sent to.

ARM Manager may relay all of the appropriate messages after the Core engines have processed them. Multiple ARMs could register to listen on a single process ID.

E3—Message Queue Database may provide all of the queue messages for all of the processes to the Process Instance correlation and validation.

E4—Message Depositor may place a newly received message into appropriate message queue by process ID in the Message Queue Database.

E5—TRIAD Designer 600 may interact with the Process Definition Database to create, edit, remove or update process definitions of any process.

E6—Process Loader may process XML configuration file and convert it to the database format. Then it may store/update it in the Process Definition Database.

E7—Adaptor Manager may prepare DQL or a similar query for the Non-Structured Adaptor, as well as providing the Process Instance ID and the Junction name.

E8—ARM Manager gets Process Definition from the Process Definition Database at the end of the ARM Registration.

M1—Monitor may retrieve the audit data from the Audit Database.

R1—ARM may deposit process definition after successful registration into Audit Database ARM may deposit incoming messages, alerts and all associated information to the Audit Database ARM may update and read Audit Database during processing of alert resolutions Business applications may include J2EE, .NET, ERP (like AccPac and SAP), and CRM type applications, inter alia.

In the embodiment described herein, the duplicate information stored in Audit trail and Process-instance databases is typically implemented so as to take into account the Engine's performance and security issues.

In contrast to work-centric methods, a message or content based BPM (business process management) does not necessitate a connection to business applications or IT (Information Technology) services, as well as process understanding. Only messaging systems that carry messages or content are typically employed. Today three different types of such systems are known: content-routed networks; message brokering systems (message broker and service bus); and content management platforms. The present invention, however, illustrates a custom adaptor to capture the relevant message from operational business application such as AccPac. Thus, some or all of the following types of adaptors may be embedded in the monitoring system:

1) Adaptor to message broker such as WLI* from BEA* or WebSphere* from IBM*

2) Adaptor to Enterprise Service Bus (ESB*) such as Aqualogic* from BEA or WebSphere* from IBM or Sonic* from Progress 3) Adaptor to content router such as SolaOs* from Solace* Systems 4) Adaptor to a ECM* platform such as EMC Corporation's Documentum system or IBM Corporation's FileNet system 5) Custom developed adaptor to ERP system for small or medium sized organizations, such as AccPac* from Sage Group.

In a set-up stage in which, typically, a human user of such a system interviews a human IT employee of the organization, whose business processes are to be monitored, typically includes performing various monitoring checks requested by the organization, which involve comparing certain data fields or computational transformations thereof, to certain other data fields or computational transformations thereof. The interview allows the software engineer to learn, and to input to the system of the present invention: (a) entities which are involved in receiving messages and/or generating messages relevant to the business process/es to be monitored, (b) software used by each such entity, to generate each type of outgoing message it generates; (c) software is used by each such entity to read each incoming message it receives (i.e. to determine the format of each type of incoming message); and (d) the organization's internal names for each of the various data fields used in the definitions of the monitoring checks requested by the organization. Process Definition Database 635 typically stores:

a. the entities b. each entity's incoming and outgoing messages=junction In and junction OUT, c. the data fields and where they are located in the incoming or outgoing messages, and d. the formulae for monitoring checks e.g. as shown in the Rule table described herein.

Process ID indicates the type of process that is being controlled and monitored, such as: Buying process (supplier-centric), insurance claim overall process (customer-centric), Selling process (customer-centric). Each Process ID typically comprises a number of transactions (instances). Process IDs are typically stored in Process Definition DB 635 of FIG. 6.

An embodiment of the Message Broker/Service Bus Adaptor 721 of FIG. 6 is now described. This adaptor connection to data source is based on SOA architecture (example ESB—Enterprise Service Bus). An adaptor using these technologies is able to obtain and filter messages from the data source and then forward them the Message Queue Database in the engine. It may use the filter capabilities of ESB (Enterprise Service Bus) itself.

ESB (Enterprise Service Bus) provides simple API for connecting and reaching the messages that run through the different applications and publisher/subscriber message brokering mechanism. An example of communication is based on the IBM Message Broker. "WebSphere Message Broker provides an advanced enterprise service bus, delivering universal connectivity and data transformation."

An adaptor uses the Message Broker publish/subscribe mechanism which facilitates receipt of messages that run through the brokers. Generally, as described in "WebSphere Message Broker Publish/Subscribe", Version 6, Release 0, posted by IBM, and as shown in prior art FIG. 11 which appears in the above post: "Publish/subscribe is a style of messaging application in which the providers of information (publishers) are decoupled from the consumer of that information (subscribers) using a broker". In a publish/subscribe system, a publisher does not need to know who uses the information (publication) that it provides, and a subscriber does not need to know who provides the information that it receives as the result of a subscription."

The following is a description of how an adaptor may get a message named "SENTPO" that is published by an organization application called "ACCPAC".

In order to have the adaptor subscribed (in the relation to the same example: AccPac as publisher and process definition as presented in the FIG. 23A-D) a developer may do the following:

1. Make connectivity to Message broker:
   a. Broker domain configured
   b. Publication—"ACCPAC" application has to publish its SENTPO message.
   c. Topic(Optional)—ACCPAC has to publish its messages with known topics (as "ACCPAC_PO" for example)
   d. Filter (optional)—"SENTPO" has field name title with value "SENTPO" (for filtering, there can be other fields as well)
   e. Adaptor queue—Adaptor Manager needs to have a queue where the messages may be sent to <QName>.
   f. Security—Adaptor Manager has to authorize Adaptor to access the broker.

Figure 11:
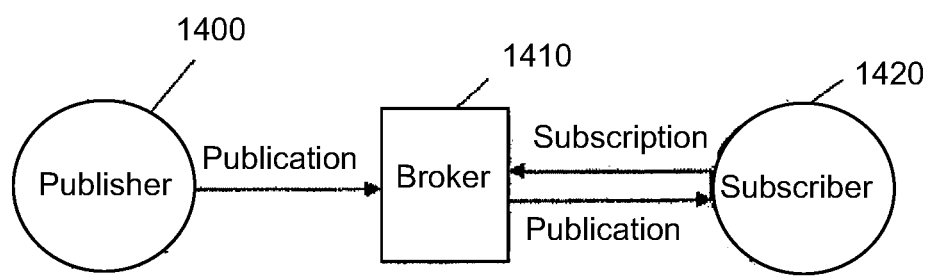
FIG. 11 is a simplified diagram of a prior art publish/subscribe mechanism.

FIG. 11 is a simplified diagram of a prior art publish/subscribe mechanism.

2. Send Subscription request:

Sends a subscription register message for adaptor. Considering that the adaptor knows the topic that ACCPAC is using and/or knows to filter, it is preferred to use these parameters in order to avoid retrieval of undesired messages. Subscription request will be provided by the following command:

<psc><Command>RegSub</Command><Topic>ACCPAC_PO
</Topic><RegOpt>PubOnReqOnly<RegOpt><Filter>Body.Title like 'SentPO'</Filter>
<QName>AdaptorQue</QName></psc>

3. Forward Message to Engine:

Once Adaptor Manager gets the message in its queue, it can translate it to the CFMessage schema and forward it to the Message Queue Database as described herein with reference to the Database Adaptor 711.

An embodiment of the Non-Structured Data Adaptor 701 of FIG. 6 is now described. Such An Adaptor takes its data from unstructured data sources as emails, faxes, and from their servers using ECM (Enterprise Content Management) tools. ECM products know how to capture, manage and store unstructured content.

Adaptor by Connecting to ECM products (such as but not limited to EMC—Documentum, Open Text, and IBM—FileNet) may retrieve messages, translate them to the CFMessage format and then forward them to the Adaptor Manager.

To develop an adaptor that obtains a message from the process where a desired document is captured and managed by the EMC family of products, for example, basic knowledge about EMC technology is employed. Two EMC products include Documentum and Captiva.

EXAMPLE

Referring to the same example of overall buying process described above with reference to FIG. 5 and FIG. 23A-D, and assuming that message-class "Receiving Report" is received by an accounting department as an attachment to an email in pdf format. EMC Captiva captures this pdf document that describes ordered items, total sum and supplier's properties.

Fetch Content from Repository:

1. Connect to Documentum repository using the Documentum API (DFC,ECI) and standard JDBC libs. Visual connection can be done also through the Repository Integration Utility.

2. Run DQL(Documentum Query Language) query to find the document that are needed. In this example, for a 'Receiving Report' document is sought, in a 'email' folder of Documentum Repository, supplier name 'ABC", item name 'television' by running the query:

SELECT*FROM dm_document SEARCH DOCUMENT Contains 'ABC <AND> television' WHERE FOLDER (ID ('0b9af3ce800001ff')) AND (object_name like '% Receiving Report %')

'Folder ID' is a DUMMY ID, just for the sake of example.

Figure 7:
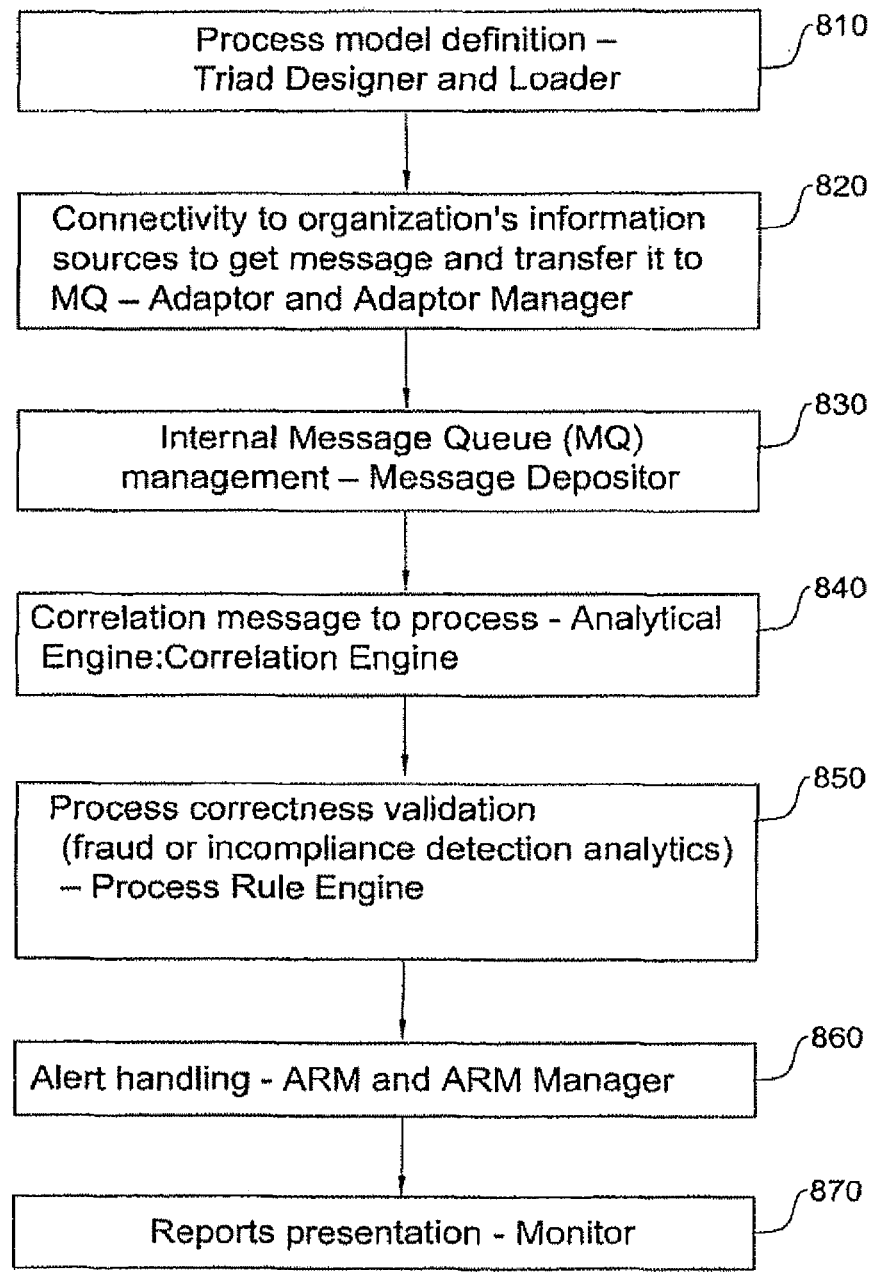
FIG. 7 is a simplified flowchart illustration of a method of operation for any of the systems of FIG. 6 constructed and operative in accordance with certain embodiments of the present invention.

FIG. 7 is a simplified flowchart illustration of a method of operation for any of the systems of FIG. 6 constructed and operative in accordance with certain embodiments of the present invention. Step 810 may be integrated with dataflow junctures D2, D3, D4 and E6 or E5 or D4, D1 and E6 of FIG. 6. Step 820 may be integrated with dataflow junctures A2, E4 and A7, A1, C7 of FIG. 6. Step 830 may be integrated with dataflow junctures A4, E4 of FIG. 6. Step 840 may be integrated with dataflow junctures E3, C5, C4 and C2 of FIG. 6 and may be performed by the analytical engine 210 of FIG. 4. Step 850 may be integrated with dataflow junctures C3, C6 and C1 of FIG. 6 and may be performed by the analytical engine 210 of FIG. 4. Step 860 may be integrated with dataflow junctures E2, E1, E8, and R1 of FIG. 6. Step 870 may be integrated with dataflow junctures M1 of FIG. 6.

Various steps in FIG. 7 may be performed in parallel such as steps 830, 840 and 850 and/or steps 840-860, and/or steps 840-860, and/or steps 860 and 870. Still with reference to FIG. 7, an embodiment of step 810 is described below with reference to FIG. 8. One embodiment of step 820 is described below with reference to FIGS. 9A-9B. Embodiments of step 840 are described below with reference to FIGS. 12, 14, 15 and 16; and also FIGS. 13A-B, 17A-B and 18. An embodiment of step 850 is described below with reference to FIGS. 19-20.

A method for performing step 820 of FIG. 7 (Connectivity to organization's information sources to get message and transfer it to the message queue) may be provided also with custom developed database adaptor. It is a mediator between an organization's data source and Engine that performs steps 840 and 850 of FIG. 7.

An adaptor sends to the correlation engine the messages content according to the messages requests which were predefined in the Process Definition XML file.

All the messages are typically sent in the XML format e.g. as defined below in order that the engine may recognize them (CFMessage schema).

```xml
<?xml version="1.0" encoding="UTF-8"?>
<schema xmlns="http://www.w3.org/2001/XMLSchema" targetNamespace="http://www.example.org/NewXMLSchema" elementFormDefault="qualified" xmlns:Q1="xs" xmlns:cf="http://www.example.org/NewXMLSchema">
<element name="Message">
   <complexType>
   <sequence>
   <element name="Properties" minOccurs="1" maxOccurs="1">
   <complexType>
     <sequence>
     <element name="Author" type="string" minOccurs="1" maxOccurs="1" />
     <element name="Time" type="time" minOccurs="1" maxOccurs="1"></element>
     <element name="Name" type="string" minOccurs="1" maxOccurs="1"></element>
     <element name="Process" type="string" minOccurs="1" maxOccurs="1"></element>
     <element name="UserData" type="string" minOccurs="1" maxOccurs="1"></element>
   </sequence>
   </complexType>
   </element>
   <element name="Fields" minOccurs="1" maxOccurs="1" >
     <complexType>
     <sequence>
     <group ref="cf:CFFieldsGroup" maxOccurs="unbounded"></group>
   </sequence>
   </complexType>
   </element>
   </sequence>
   </complexType>
</element>
<!-- GROUPS-->
<group name="CFFieldsGroup">
   <choice>
      <element name="Number" type="cf:CFNumber" nillable="true"></element>
      <element name=" String" type="cf:CFString"></element>
      <element name="Date" type="cf:CFDate"></element>
      <element name="Time" type="cf:CFTime"></element>
      <element name="Double" type="cf:CFDouble"></element>
      <element name="Boolean" type="cf:CFBoolean"></element>
      <element name="Table" type="cf:CFTable"></element>
      <element name="Vector" type="cf:CFVector"></element>
      <element name="Amount" type="cf:CFAmount"></element>
   </choice>
</group>
<attributeGroup name="CFieldAtrributes">
<attribute name="name" type="string"></attribute>
</attributeGroup>
<!-- CFTypes -->
<complexType name="CFNumber" >
<simpleContent >
<extension base="integer" >
   <attributeGroup ref="cf:CFieldAtrributes"></attributeGroup>
</extension>
</simpleContent>
</complexType>
<complexType name="CFString">
<simpleContent>
   <extension base="string">
      <attributeGroup ref="cf:CFieldAtrributes"></attributeGroup>
   </extension>
</simpleContent>
</complexType>
<complexType name="CFDouble">
   <simpleContent>
      <extension base="double">
         <attributeGroup ref="cf:CFieldAtrributes"></attributeGroup>
      </extension>
</simpleContent>
</complexType>
<complexType name="CFBoolean">
<simpleContent>
   <extension base="boolean">
      <attributeGroup ref="cf:CFieldAtrributes"></attributeGroup>
   </extension>
</simpleContent>
</complexType>
<complexType name="CFDate">
<simpleContent>
   <extension base="date">
      <attributeGroup ref="cf:CFieldAtrributes"></attributeGroup>
   </extension>
</simpleContent>
```

```
</complexType>
<complexType name="CFTime">
  <simpleContent>
    <extension base="time">
      <attributeGroup ref="cf:CFieldAtrributes"></attributeGroup>
    </extension>
  </simpleContent>
</complexType>
  <complexType                                              name="CFField"><attributeGroup
ref="cf:CFieldAtrributes"></attributeGroup></complexType>
  <complexType name="TableHeader">
    <sequence>
      <element    name="Col"    type="cf:CFColumn"    maxOccurs="unbounded"
minOccurs="1"></element>
    </sequence>
  </complexType>
  <complexType name="TableRows">
    <sequence>
      <element    name="Row"    type="cf:CFVector"    maxOccurs="unbounded"
minOccurs="0"></element>
    </sequence>
  </complexType>
  <complexType name="CFTable">
        <sequence>
          <element name="Columns" type="cf:TableHeader"
            maxOccurs="1" minOccurs="1">
          </element>
          <element name="Rows" type="cf:TableRows"
            maxOccurs="1" minOccurs="1">
          </element>
        </sequence>
        <attribute name="rowsNumber" type="int"></attribute>
        <attribute name="colsNumber" type="int"></attribute>
        <attributeGroup ref="cf:CFieldAtrributes"></attributeGroup>
</complexType>
<complexType name="CFColumn">
  <simpleContent>
    <extension base="string">
        <attribute name="type" type="string"></attribute>
      <attributeGroup ref="cf:CFieldAtrributes"></attributeGroup>
    </extension>
  </simpleContent>
</complexType>
<complexType name="CFVector">
  <sequence>
    <group ref="cf:CFFieldsGroup" maxOccurs="unbounded"></group>
  </sequence>
  <attributeGroup ref="cf:CFieldAtrributes"></attributeGroup>
</complexType>
<complexType name="CFAmount">
  <sequence>
      <element name="Count" type="double" maxOccurs="1"
        minOccurs="1">
      </element>
      <element name="Type">
      <complexType>
      <simpleContent>
        <extension base="string">
          <attributeGroup ref="cf:CFieldAtrributes"></attributeGroup>
        </extension>
      </simpleContent>
      </complexType>
      </element>
    </sequence>
  </complexType>
</schema>
```

Each message adaptor:

Reads/gets message content from the organization information source

Translates this message content into xml format

Deposits message in the Engine by calling the engine web service (see below).

Receives confirmation message from Engine.

Both Engine and Adaptor publish web services for communication between them.

Engine web service allows: Deposit message and Register adaptor

Adaptor web service allows bringing of Database Tables with native field names for mapping.

The adaptor, when it initializes, registers itself at the Engine, and then initiates a two-sided start to communicate.

Figure 9A:
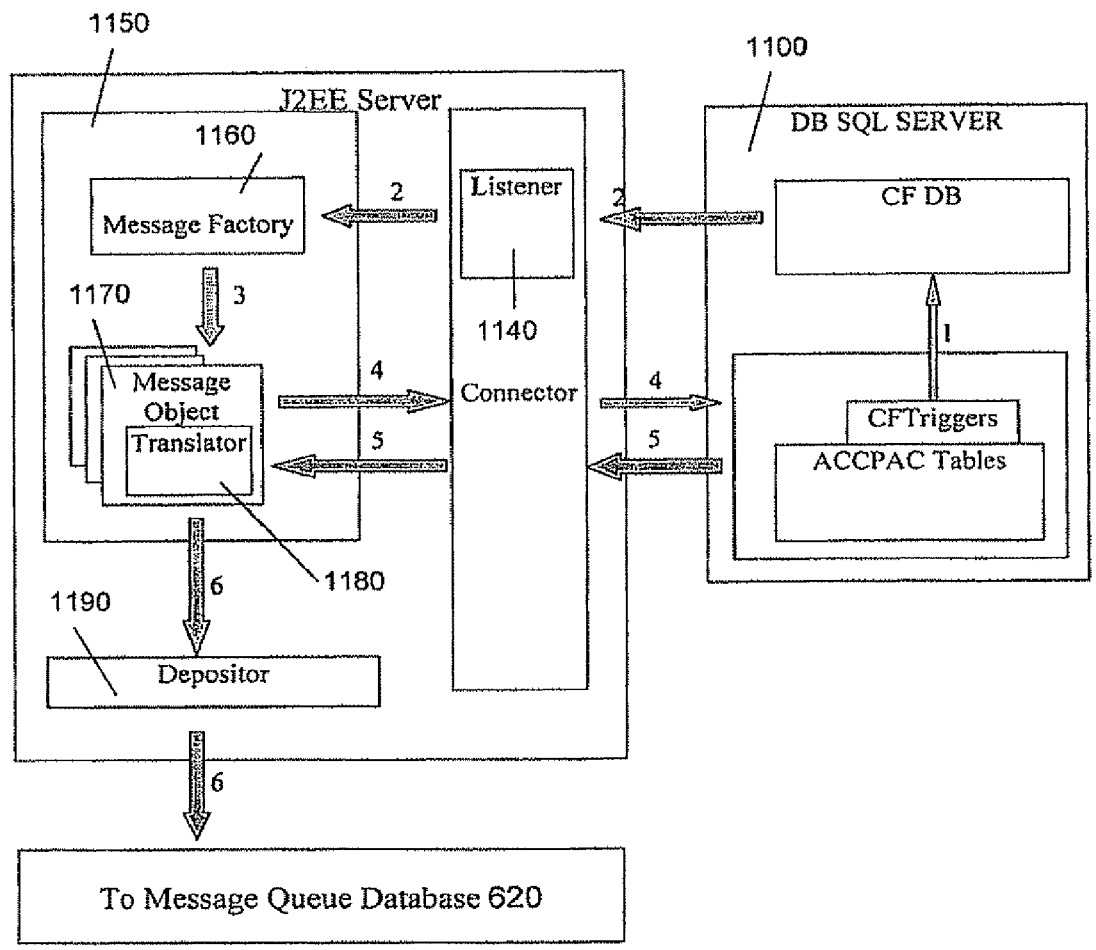
FIG. 9A is a simplified functional block diagram of an database adaptor constructed and operative in accordance with certain embodiments of the present invention.
Figure 9B:
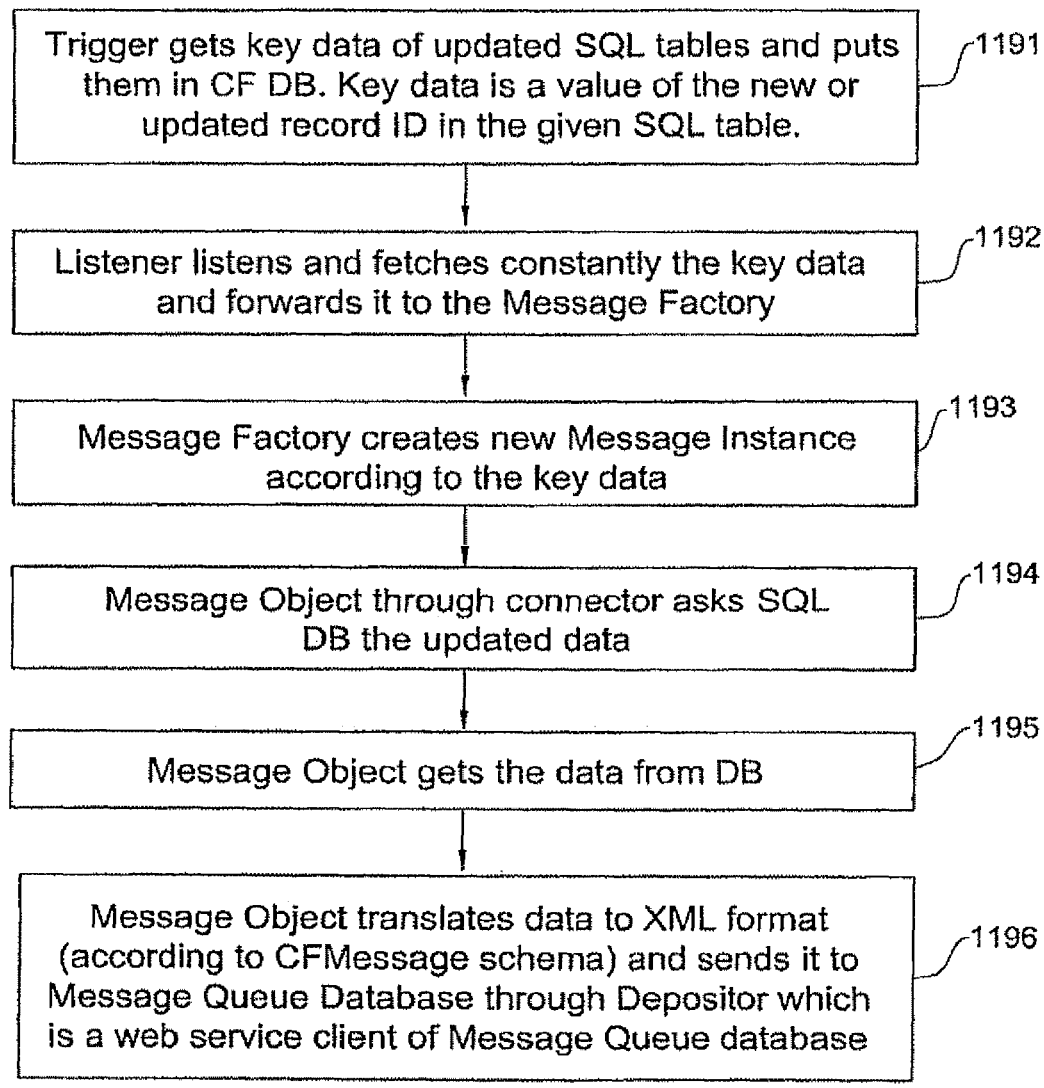
FIG. 9B is a simplified flowchart illustration of a preferred method of operation of the adaptor of FIG. 9A, in accordance with certain embodiments of the present invention.

FIG. 9A is a simplified functional block diagram of a database adaptor, e.g. for SQL databases, constructed and operative in accordance with certain embodiments of the present invention. FIG. 9B is a simplified flowchart illustration of a preferred method of operation of the adaptor of FIG. 9A, in accordance with certain embodiments of the present invention.

A preferred method of operation for the apparatus of FIG. 9A is shown in FIG. 9B. As shown, the method may include the following steps suitably ordered e.g. as shown:

Step 1191. Trigger gets key data of updated SQL database (DB) tables and puts them in CF DB. Key data is a value of the new or updated record ID in the given DB table.

Step 1192. Listener listens and fetches constantly the key data and forwards it to the Message Factory Step 1193. Message Factory creates new Message Instance according to the key data Step 1194. Message Object through connector asks SQL DB re the updated data Step 1195. Message Object gets the data from DB Step 1196. Message Object translates data to XML format (according to CFMessage schema) and sends it to Message Queue Database through Depositor which is a web service client of Message Queue database.

An example of database adaptor creation for AccPac is described below.

database. Each update may issue a new row in this table, containing information which refers to a change in the original tables.

A CFMessages table contains the following columns:

1. messageName—Logical name given for this message. Using this name, an adaptor may know how to find the original table in the ACCPAC DB.

2. messageKey—A key value of the original table message. An adaptor has to know the key field name and by using this value, so that it can track the updated row in the table.

3. messageTime—time of message, created automatically.

4. messageFlag—status of the message(0—at this stage it has not been read yet by the adaptor, 1—read successfully, 2—read with exceptions), come default with value 0.

5. messageId—internal auto increase number for message-instance.

Trigger: For each table that the system of the present invention is to track, a trigger is typically constructed. Trigger may insert into the CFMessages table a new row each time one of the viewed tables is updated. For example trigger sql for inserting new row in requisition may be:

```
CREATE TRIGGER [dbo].[newRequisition]
ON [dbo].[PORQNHi]
   AFTER INSERT
AS
BEGIN
   SET NOCOUNT ON;
   DECLARE @requisitionSeq varchar(8000);
   SET @requisitionSeq = (SELECT RQNHSEQ from inserted);
   INSERT                              [CF].[dbo].cfMessages(messageName,messageKey)
VALUES('REQUISITION',@requisitionSeq);
END
```

Sage Accpac is an award-winning accounting system that integrates with a complete set of end-to-end business solutions, including CRM, HRMS, warehouse management and more.

ACCPAC database is a type of SQL server DB.

The "Process Definition" file which describes the messages and their fields is typically employed. Steps for adaptor creation include development of the J2EE server, and the Accpac database server (SQL side).

SQL Side:

The CF DB and Trigger and the ACCPAC are typically installed on the same SQL server.

Create new CF DB in the SQL server, which may include only one table "CFMessages". This table retains information on all the updates that have been done in the ACCPAC J2EE Server side—develop the following functional components as J2EE web application server.

a. Message Object—Each junction (message-class) that was defined in the "Process Definition" XML file typically has an equivalent component that reads its content from the DB tables.

For example: The junction "Requisition" in FIG. 5 and FIG. 10 as well, may have equivalent "Requisition" message class that may know to query the ACCPAC DB on all appropriate fields. Query can be done through sql syntax as:
   jdbc.executeQuery("select    AUDTUSER,RQNHSEQ, RQNNUMBER,VDCODE,VDNAME,REQUESTBY, DATE,LINES from PORQNH1 where RQNHSEQ="+key);
   where "key" is the key value of the updated row.

Messageclasses may have a function that transform their content to predefined XML format (CFMessage). For example Result of the transformation may be as follows:

```
<?xml version=" 1.0" encoding="UTF-8"?>
<cf:Message                         xmlns:cf="http://www.example.org/NewXMLSchema"
xmlns:xsi="http://www.w3.org/2001/XMLSchema-instance"
xsi:schemaLocation="http://www.example.org/NewXMLSchema NewXMLSchema.xsd ">
   <cf:Properties>
      <cf:Author>Ronen Bigon</cf:Author>
         <cf:Time>23:59:59</cf:Time>
         <cf:Name>PORQNH1</cf:Name>
         <cf:Process>ACCPAC_PO</cf:Process>
         <cf:UserData></cf:UserData>
   </cf:Properties>
   <cf:Fields>
      <cf:String name="VDCODE">24444</cf:String>
```

-continued

```
    <cf:String name="AUDTUSER">Ronen</cf:String>
    <cf:Double name="DOCTOTAL">599.99</cf:Double>
    <cf:Date name="DATE">2007/04/12</cf:Date>
    <cf:Table name="LINES" >
    <cf:Rows>
      <cf:Row>
        <cf:Column name='ITEMNO'>IPOd Nano</cf:Column>
        <cf:Column name='RQRECEIVED'>2</cf:Column>
        <cf:Column name='UNITCOST'>2245</cf:Column>
      </cf:Row>
      <cf:Row>
        <cf:Column name='ITEMNO'>AppleTV</cf:Column>
        <cf:Column name='RQRECEIVED'>11</cf:Column>
        <cf:Column name='UNITCOST'>31456.34</cf:Column>
      </cf:Row>
    </cf:Rows>
    </cf:Table>
  </cf:Fields>
</cf:Message>
``` b. Messages factory—Creates a Message Instance according to a table and the logical name. The list of logical names and their matching tables may be known to the developer from the "process definition" file.

c. Listener—Tracks the CF DB constantly and returns a message to all messages rows that their status is 0 i.e. has not been read). For each message, a listener fetches the message logical name and the key value. Using these values, it can call the message factory to create a message instance.

d. Connector—JDBC connection to the Database e. Depositor—Every message instance creates xml. This xml is forwarded to the Engine (Message Queue database) through WSDL that the Engine provides.

Once the Engine receives the message it return confirmation response with value 1(ok) or 2 (in case of error in message content). The listener returns the server confirmation value.

Figure 10:
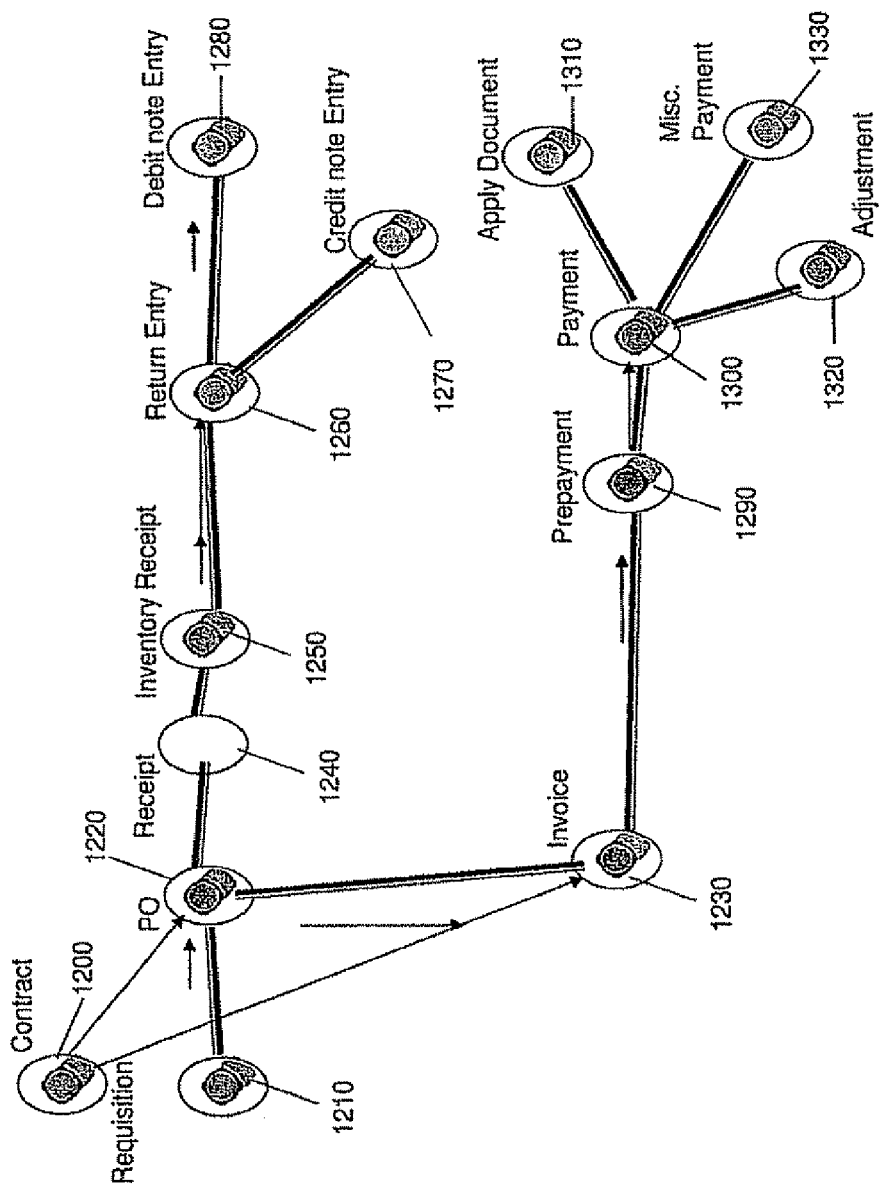
FIG. 10 is a diagram of a plurality of interconnected nodes representing a business process, for an AccPac application all in accordance with certain embodiments of the present invention.

FIG. 10 is a diagram of a plurality of interconnected nodes representing a business process, for an AccPac application, all in accordance with certain embodiments of the present invention.

Figure 12:
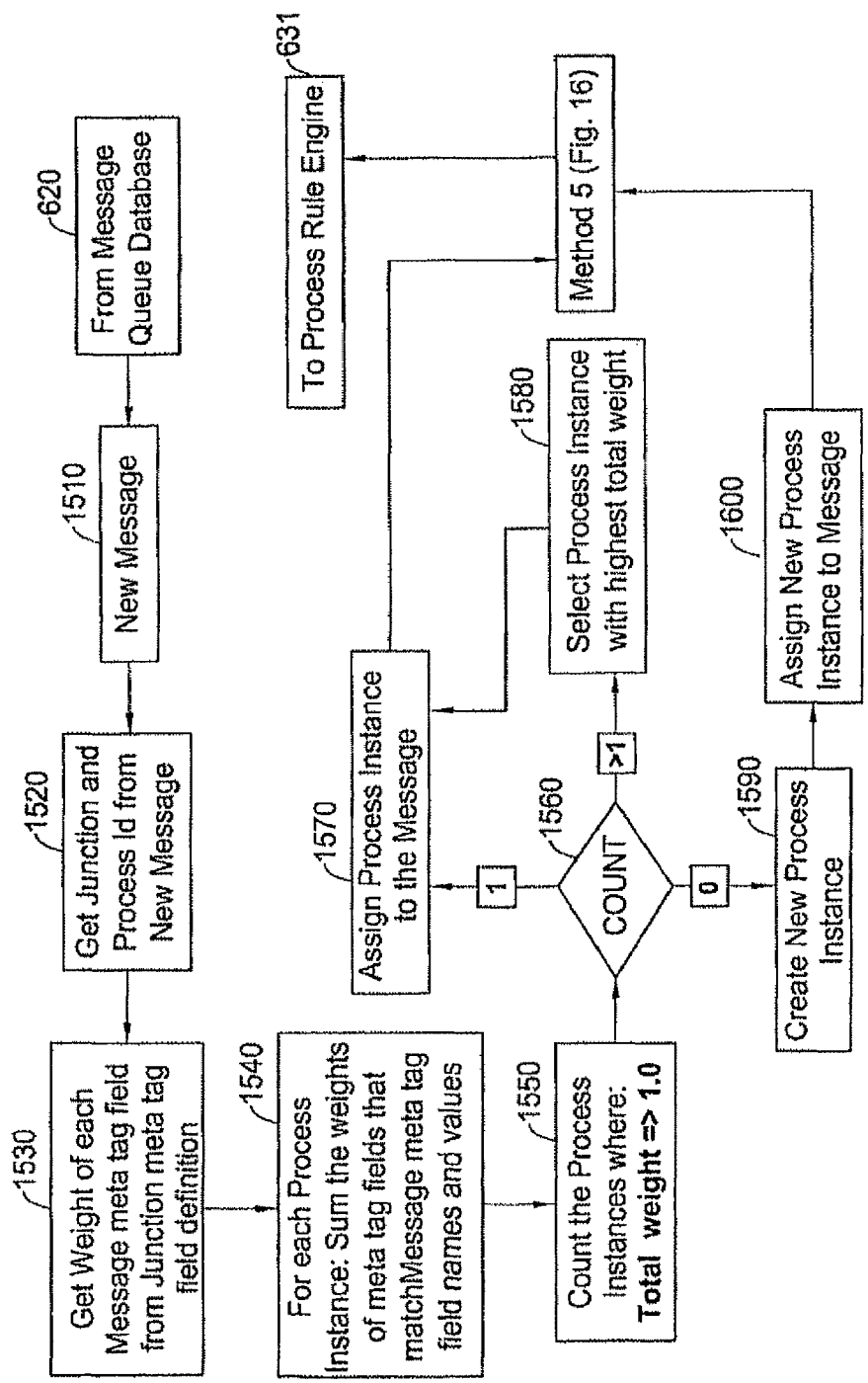
FIG. 12 is a simplified flowchart illustration of a process instance correlation method, also termed herein "method 1", which is useful in implementing the message-to-process correlation step 840 of FIG. 7 and which is particularly useful for structured data arriving at the message queue, which is constructed and operative in accordance with certain embodiments of the present invention.

FIG. 12 is a simplified flowchart illustration of a process instance correlation method, also termed herein "method 1", which is useful in implementing the message-to-process correlation step 840 of FIG. 7 and which is particularly useful for structured data arriving at the message queue, which is constructed and operative in accordance with certain embodiments of the present invention.

Figure 13A:
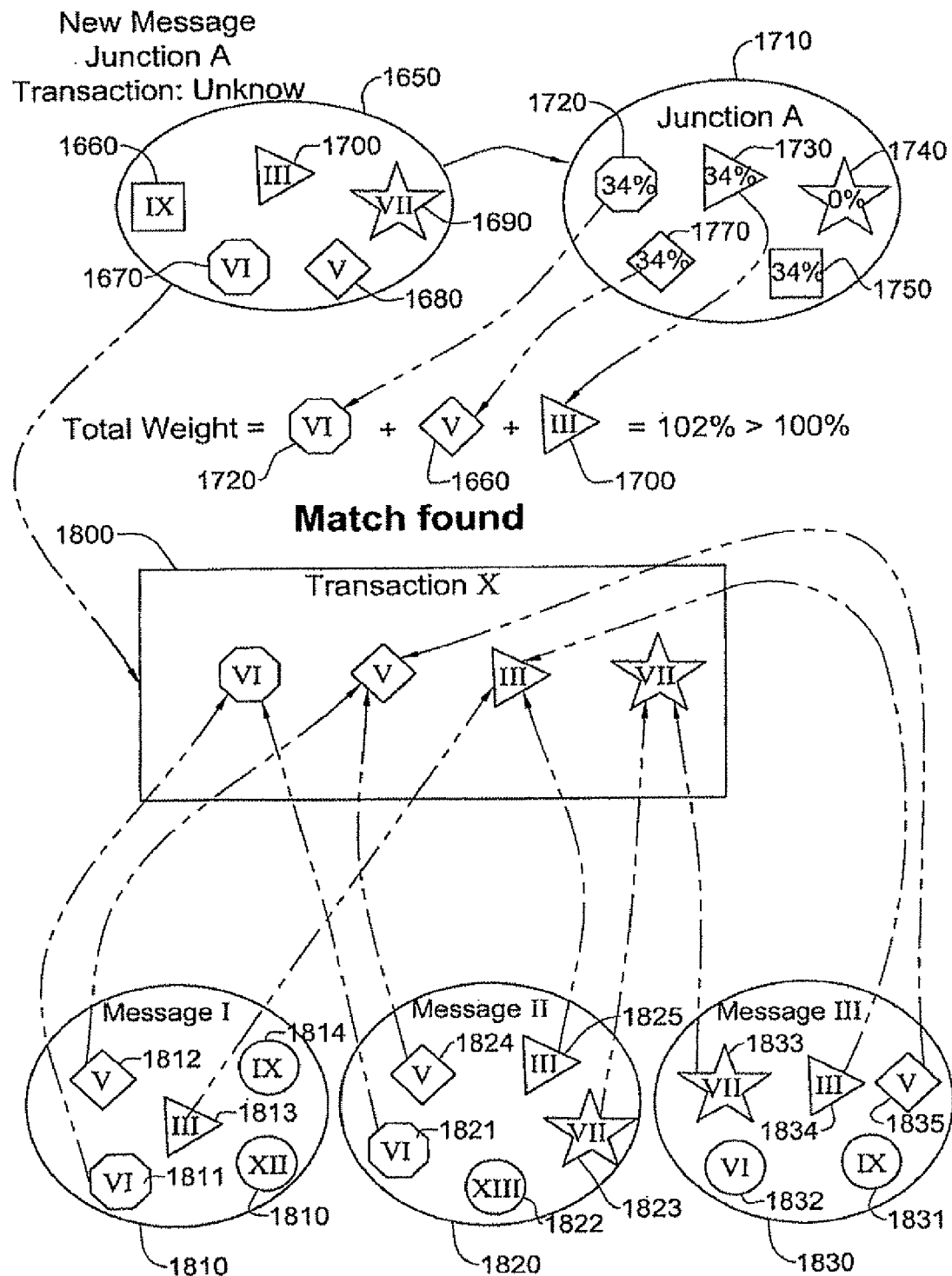
FIGS. 13A-13B are diagrams illustrating operation of a transaction identification steps in a correlation method such as the correlation methods of FIG. 12 and FIG. 14, in which, respectively, a match is and is not found, all in accordance with certain embodiments of the present invention.
Figure 13B:
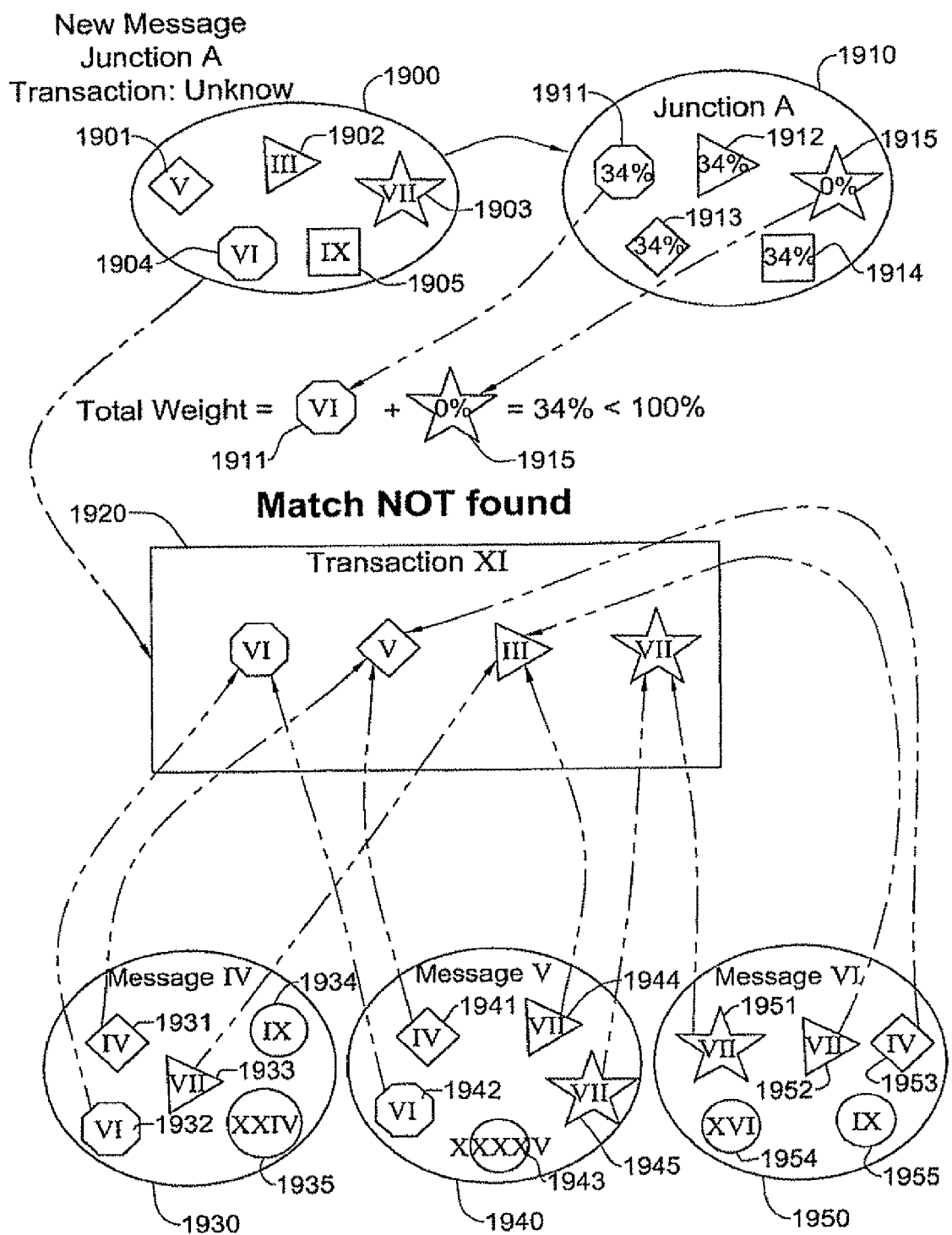
Figure 14:
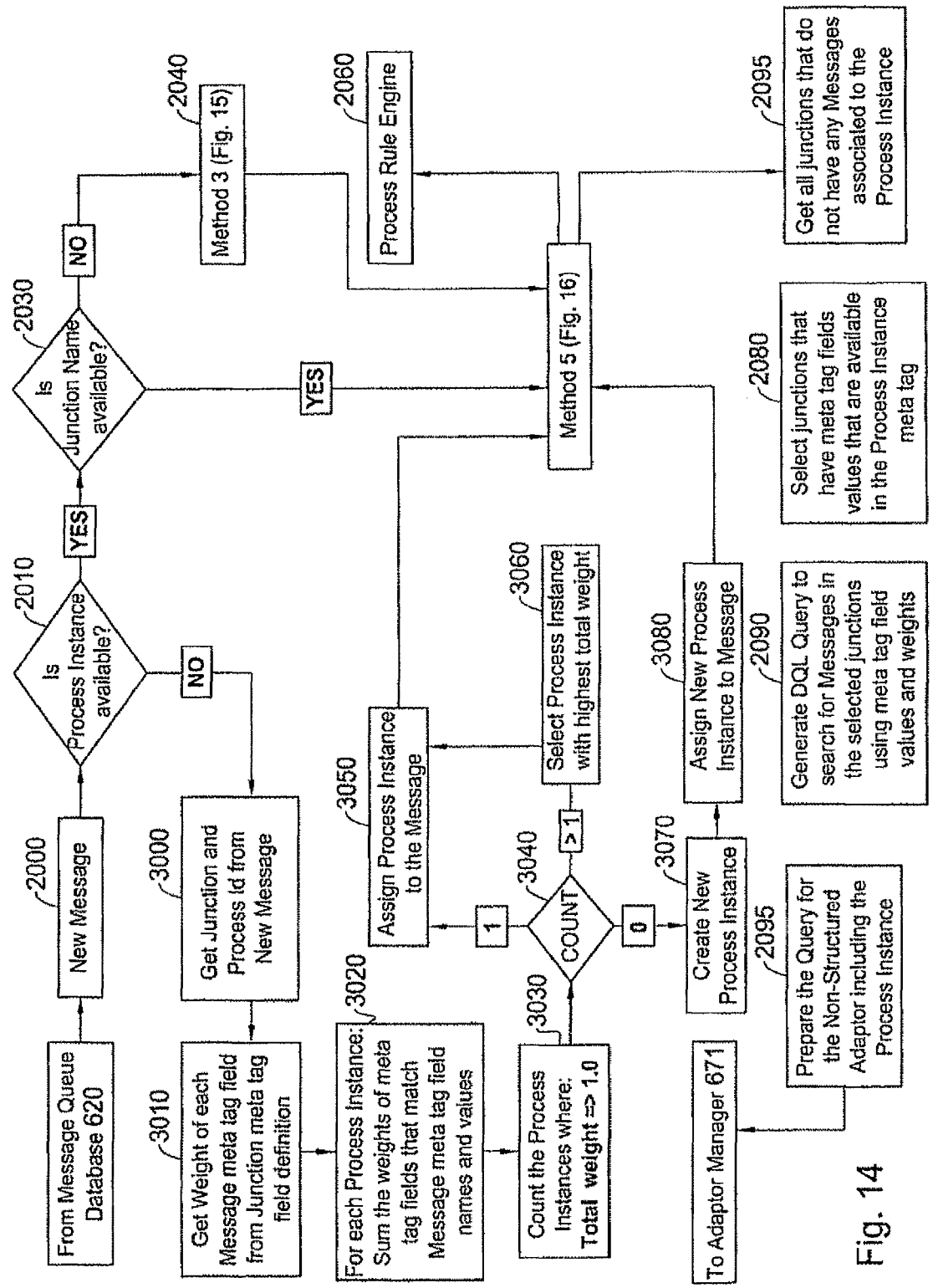
FIG. 14 is a simplified flowchart illustration of a process instance correlation method, also termed herein "method 2", useful for structured data, but also useful for non- or semi-structured data (such as but not limited to Gmail or Outlook email messages, and messages having EMC Documentum format) arriving at the message queue, the method being useful in implementing the control step 850 of FIG. 7, the method being constructed and operative in accordance with certain embodiments of the present invention.

FIGS. 13A-13B are diagrams illustrating operation of a transaction identification steps in a correlation method such as the correlation methods of FIGS. 12 and 14, in which, respectively, a match is and is not found, all in accordance with certain embodiments of the present invention. The small shapes in FIGS. 13A-13B, 17A-17B and 18 denote various meta-tag data fields (such as those in the table of FIGS. 23A-23D). Since meta-tag generation for each junction in the process definition network is completed, the meta-tag data fields included in each Process Id are known. As a message arrives, its meta-tag data field's value is written to a transaction. Therefore, it is not necessary to search and analyze the field value of prior incoming messages that belong to the same transaction. In FIG. 13A, meta-tag data fields: VI, V and III, whose values match the same data fields' value of the newly incoming message, are already written to transaction 1800. The newly incoming message relates to the junction that comprises the meta-tag data field weights. The current message is assigned (correlated) to transaction 1800 because the sum of the fields VI, V, III which match the already signed (merged) previously incoming messages I, II, III whose field values have been collected to the transaction, is more than 1 (or 100%).

In FIG. 13B, a message cannot be assigned to transaction 1920 because the sum of the meta-tag data fields weights that match those that have been written to the transaction, is less than 1 (or 100%).

Figure 15:
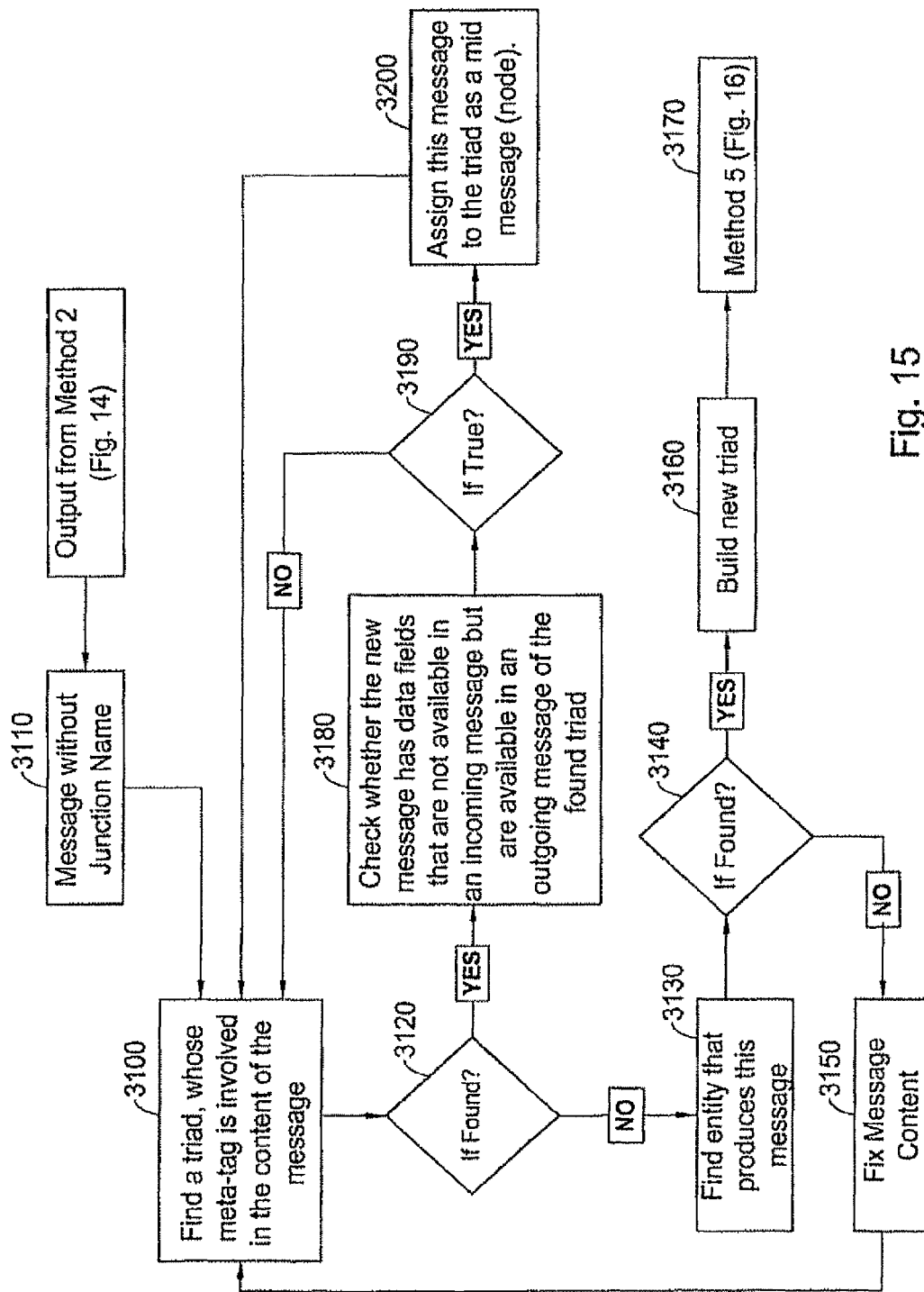
FIG. 15 is a simplified flowchart illustration of a method, also termed herein "method 3" for inserting a new junction into a network of nodes, in which the "fix message content" and "build new triad" steps may be performed by a human user of the system, the method being useful in implementing the method of FIG. 14 and being constructed and operative in accordance with certain embodiments of the present invention.

FIG. 14 is a simplified flowchart illustration of a process instance correlation method, also termed herein "method 2", useful for structured data, but also useful for non- or semi-structured data (such as but not limited to Gmail or Outlook email messages, and messages having EMC format, i.e. format provided with EMC Documentum product family) arriving at the message queue, the method being useful in implementing the step 840 of FIG. 7, the method being constructed and operative in accordance with certain embodiments of the present invention FIG. 15 is a simplified flowchart illustration of a method, also termed herein "method 3", for inserting a new junction (or node) into a process network, in which the "fix message content" and "build new triad" steps may be performed by a human user of the system, the method being useful in implementing the method of FIG. 14 and being constructed and operative in accordance with certain embodiments of the present invention.

Figure 16:
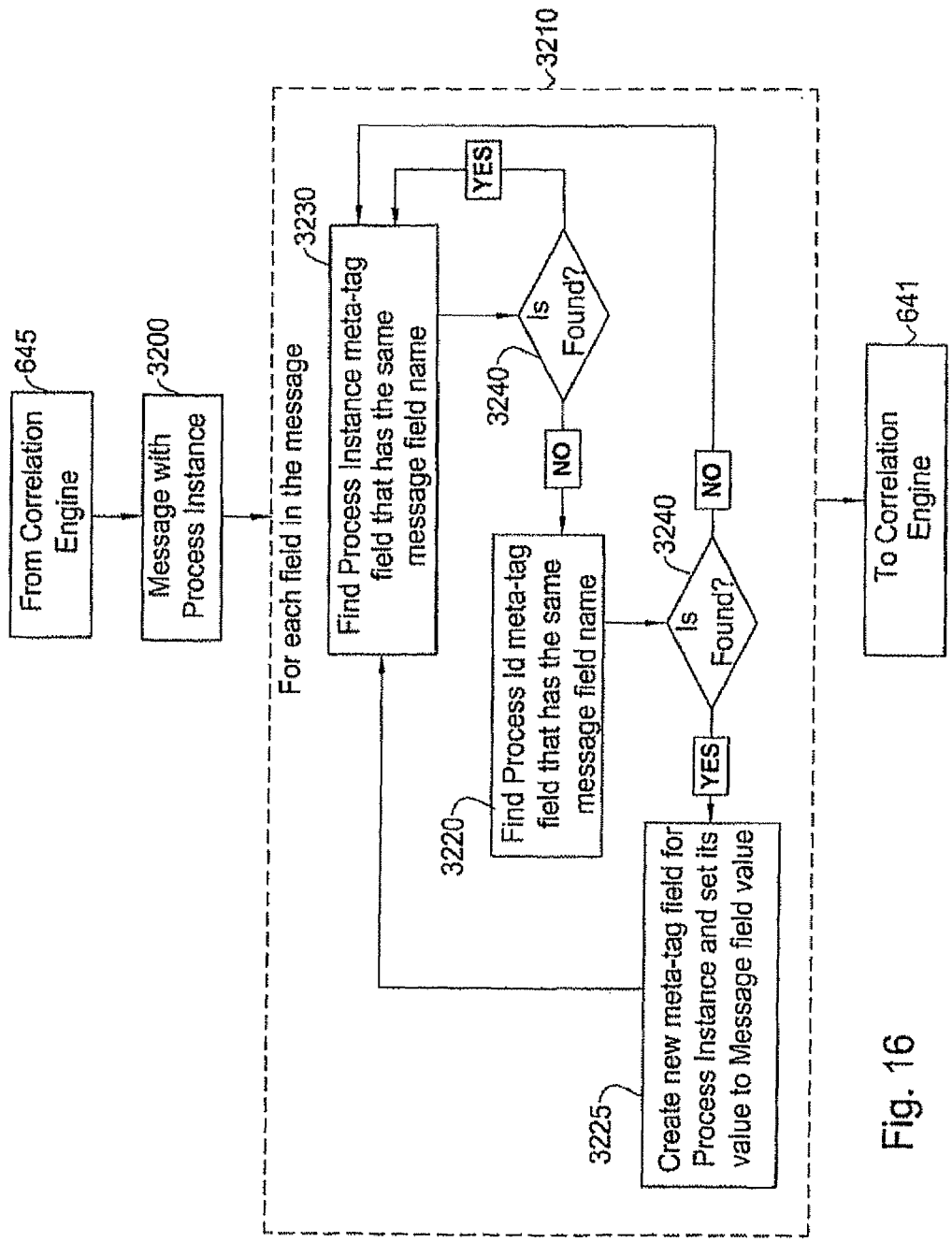
FIG. 16 is a simplified flowchart illustration of a method, also termed herein "method 5", for merging a message-instance into a process-instance, useful in implementing the methods of FIGS. 12 and 14, which is constructed and operative in accordance with certain embodiments of the present invention.

FIG. 16 is a simplified flowchart illustration of a method, also termed herein "method 5", for merging a message-instance into a process-instance, useful in implementing the methods of FIGS. 12 and 14, which is constructed and operative in accordance with certain embodiments of the present invention.

Figure 17A:
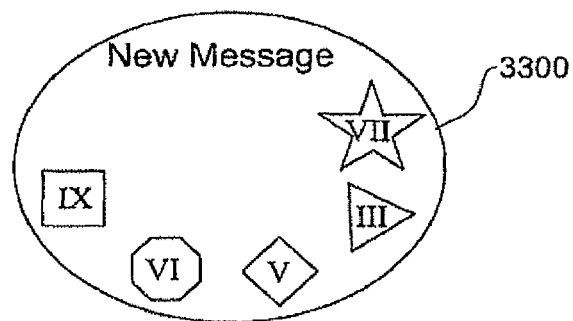
FIGS. 17A-17B are diagrams illustrating a state before operation of steps "Assign process instance to message" in a correlation method such as the correlation methods of FIGS. 12 and 14, in which a new message is merged into an existing transaction, all in accordance with certain embodiments of the present invention.
Figure 17B:
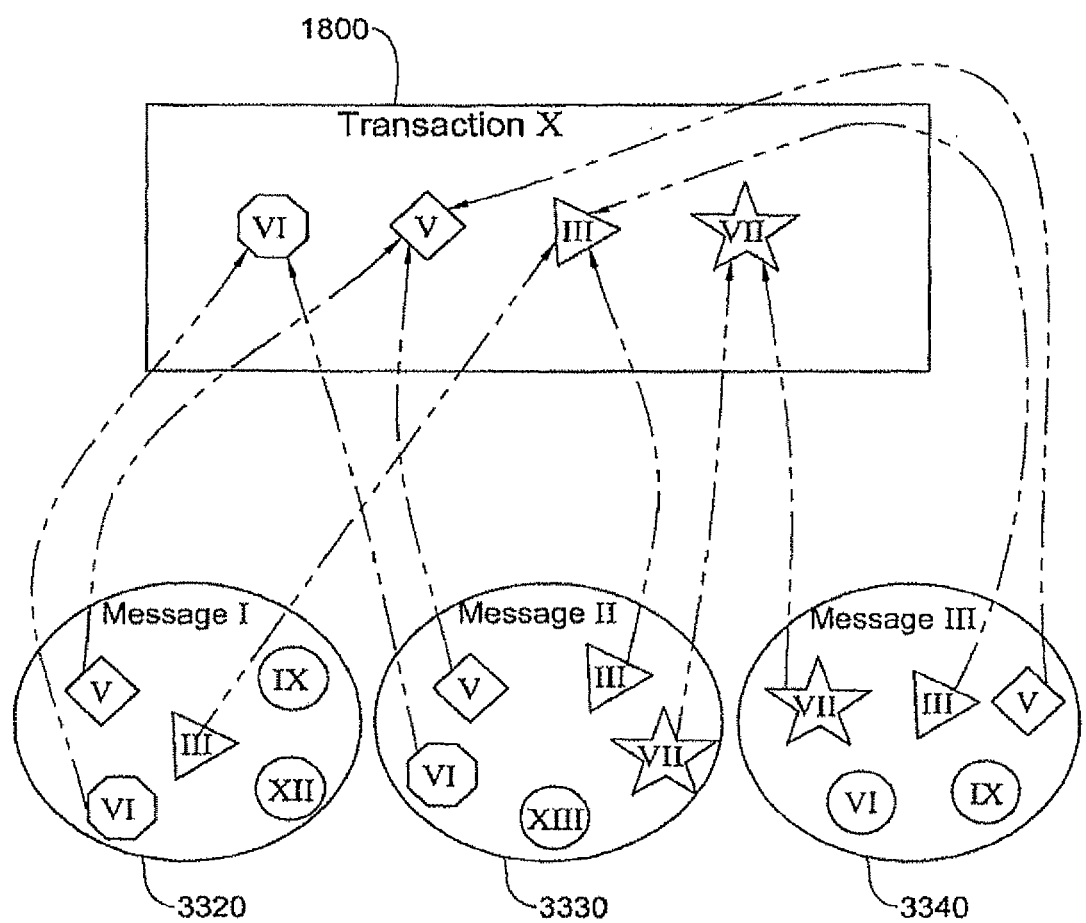

FIGS. 17A-17B are diagrams illustrating a newly coming message and a transaction (process instance) to which the message is to be correlated before a correlation method such as the correlation methods of FIGS. 12 and 14 is applied, all in accordance with certain embodiments of the present invention.

Figure 18:
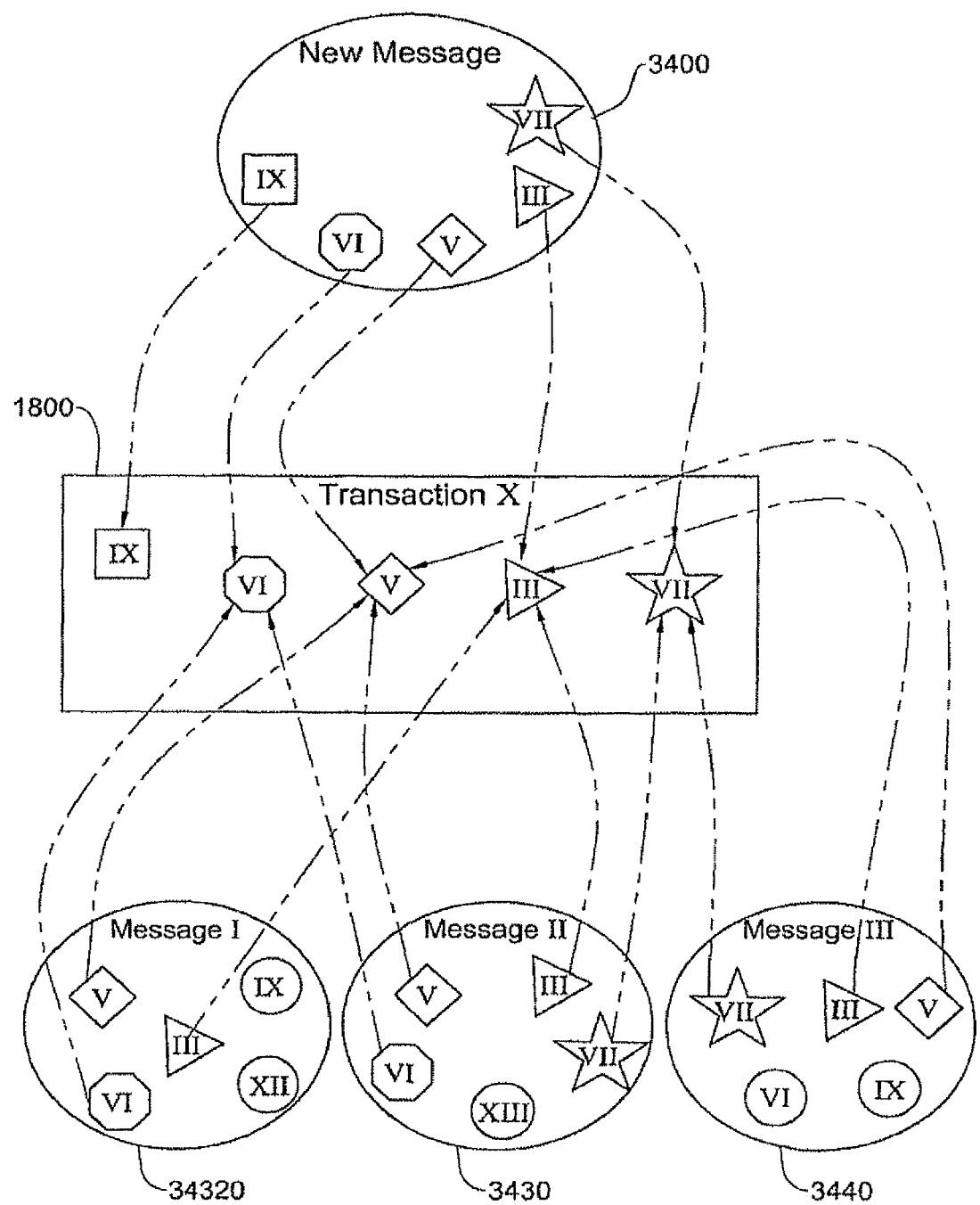
FIG. 18 is a diagram illustrating operation of a steps "Assign process instance to message" in a correlation method such as the correlation methods of FIGS. 12 and 14, in which a new message is merged into an existing transaction, all in accordance with certain embodiments of the present invention.

FIG. 18 is a diagram illustrating operation of the steps included in block 3210 in the message to process instance assignment method of FIG. 16, which is applied as a final step in a correlation method such as the methods of FIGS. 12 and 14, in which a new message is merged into an existing transaction, all in accordance with certain embodiments of the present invention. Correlation (or transaction identification) and merging a message to transaction, e.g. as shown in FIGS. 13A-13B, 17A-17B and 18, typically comprises assigning a process instance ID to a message and/or finding a process instance that a current message-instance belongs to. FIGS. 13A and 13B exemplify and clarify how a transaction that a message instance belongs to, may be found.

FIGS. 17A-18 illustrate a process of merging in accordance with method 5 of FIG. 16. The transaction 1800 is that which was found to be correlated to the newly incoming message. Previously there were 3 messages already correlated by their meta-tag data fields VI, V, III and VII. The new incoming message may comprise a new data field IX whose name is to be used in the meta-tag of the upcoming messages. The value of this field may be added to the transaction (transaction 1800) for use in further correlation method processing.

Figure 19:
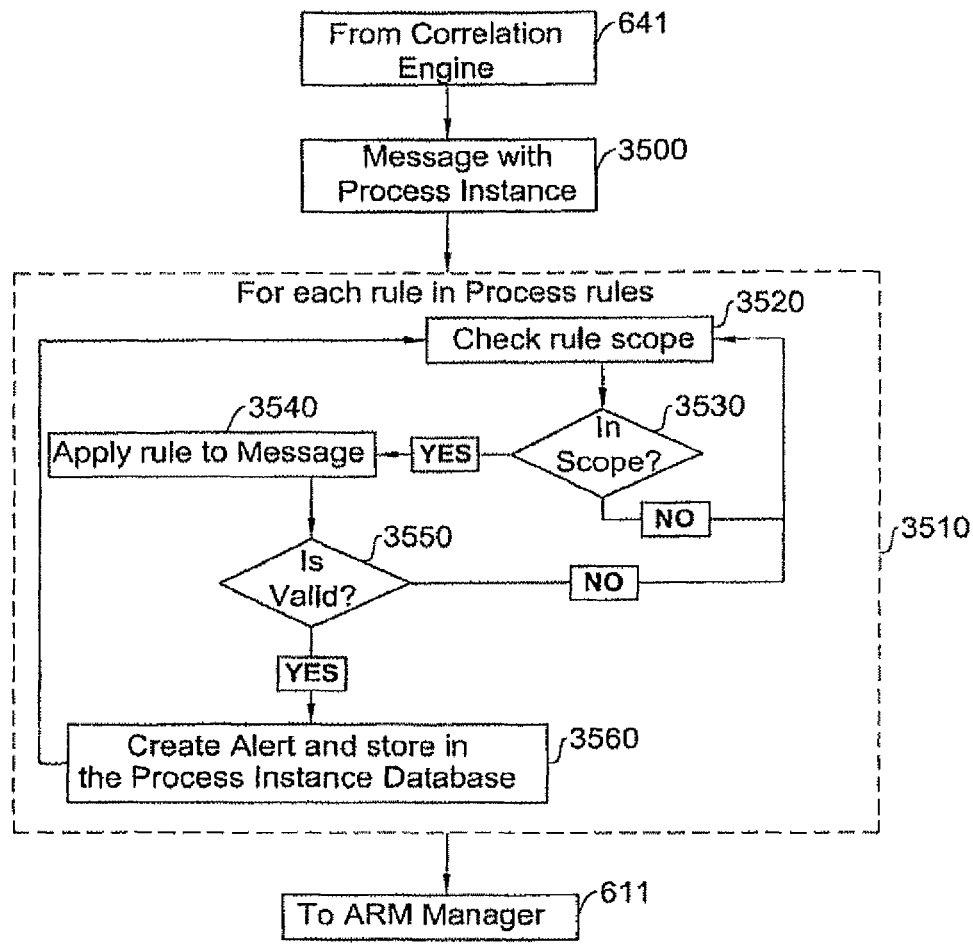
FIG. 19 is a simplified flowchart illustration of a method, also termed herein "method 4", for process correctness validation, which is constructed and operative in accordance with certain embodiments of the present invention.
Figure 22:
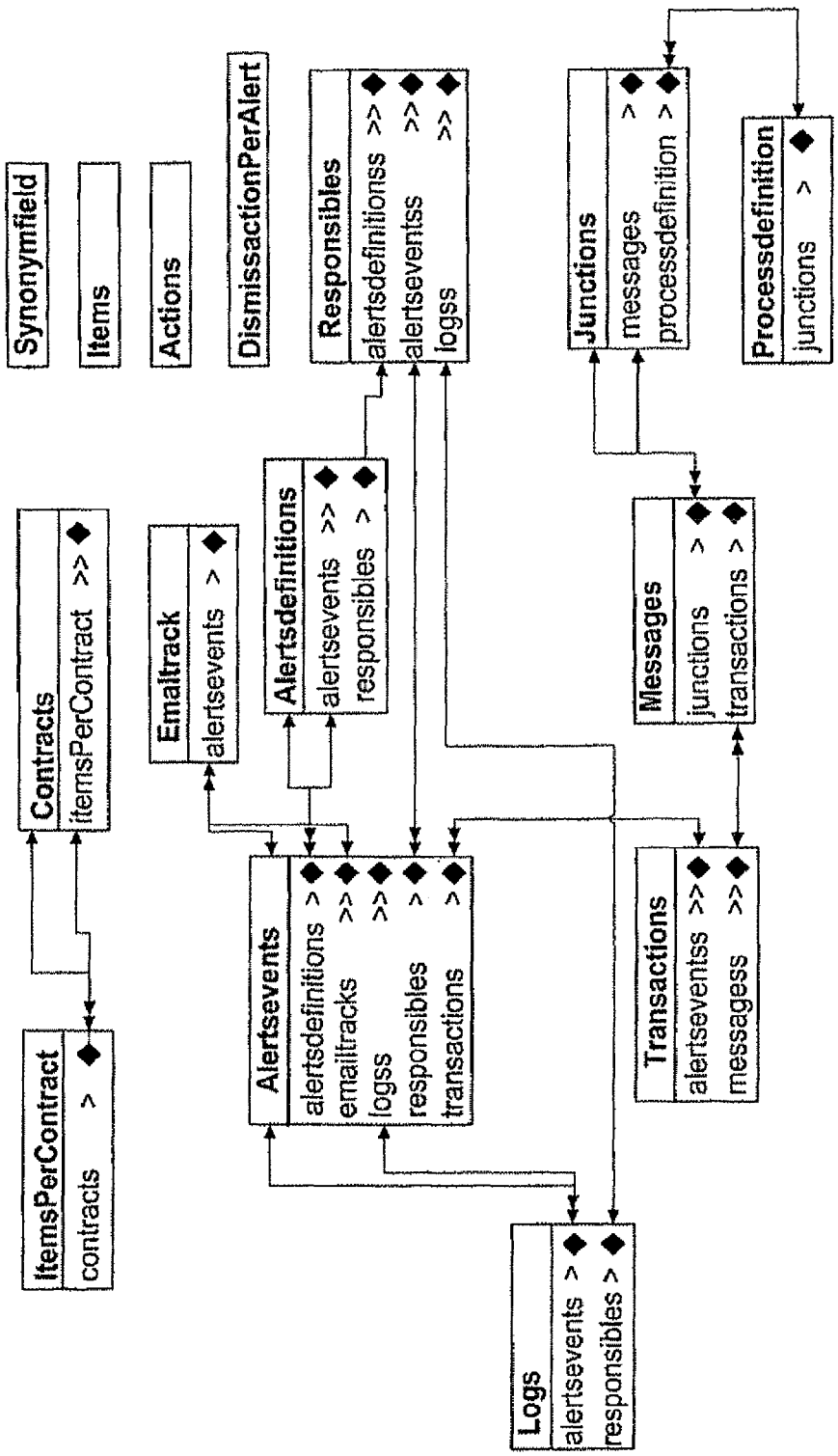
FIG. 22 is a simplified diagram of an example of a suitable data structure for the Audit database 103 of FIG. 6.

FIG. 19 is a simplified flowchart illustration of a method, also termed herein "method 4", for process correctness validation, which is constructed and operative in accordance with certain embodiments of the present invention. This may be performed by block 631 of FIG. 6.

FIG. 20 is a simplified flowchart example of a preferred method of applying one of the rules in block 3540 of FIG. 19, the method being constructed and operative in accordance with certain embodiments of the present invention. This rule typically allows the Process Rule Engine to detect in real time the errors in keying in data into a business application and fraud, as well.

FIG. 21 is a table of relationships between specific alerts and ARM (Alert Resolution Manager) actions, and between specific rules, all in accordance with certain embodiments of the present invention. Embedded Rules may be applied with each message-instance. First, the customer may be asked to define which data fields he would like to check during the process execution. For this purpose we may provide the customer with a predefined list of such fields, for example:

1. SupplierName
2. SupplierNumber
3. Total (sum or ordered items)
4. ItemNumber
5. ItemDescription
6. ItemQuantity Examples of rules are listed below and relate to the process represented in the FIG. 10 or FIG. 5. It is appreciated that the 11 rules specifically described can be provided, or not provided, or only some may be provided; and other rules may be added.

Rule1:

| IF message "Returns" is not available for the current message: | AND |
|---|---|
| SupplierName | OR |
| SupplierNumber | OR |
| Total | OR |
| ItemNumber | OR |
| ItemDescription | OR |
| ItemQuantity" | |

Not equal the same data for the previous messages,
THEN alert message: "Error in data <DataName>"

In the diagram of FIG. 20, "A" refers to a predefined data field that is typically checked during process execution. So, CM.A means field A of the current message and M.A—the same field of any other message.

Rule2

| IF we get message more than first time | AND |
|---|---|
| the junction is yellow OR red | AND |
| SupplierName | OR |
| SupplierNumber | OR |
| Total | OR |
| ItemNumber | OR |
| ItemDescription | OR |
| ItemQuantity" data | |

Equal the same data for the previous messages,
THEN alert message: "Correct junction color"

Rule3

| IF we get message more than first time | AND |
|---|---|
| the junction is yellow OR normal | AND |
| SupplierName | OR |
| SupplierName | OR |
| Total | OR |
| ItemName | OR |
| ItemDescription | OR |
| ItemQuantity" data | |

Not equal the same data for the previous messages,
THEN alert message: "Inappropriately altering information <DataName>"

Rule4

| IF the message name is Invoice, | AND |
|---|---|
| we get it more than one time | AND |
| color of message junction is normal, | AND |
| SupplierNumber | AND |
| Total | |
| equal the same data for the previous Invoice message | |
| THEN alert message: "Double Payment for <SupplierNumber> occurs" | |

Rule5

| IF the message name is Invoice OR Receipt | AND |
|---|---|
| message PO is not available in the transaction path, | |
| THEN alert message: "Fraud: Ghost Invoice" | AND |
| paint the message junction in Red | |
| Rule6 (Rule 1 applied especially for several messages) | |
| IF the current message name is Inventory Receipt | AND |
| Total | OR |
| ItemNumber | OR |
| Item Description | OR |
| ItemQuantity | |
| not equal to the same data into PO message, | |
| THEN alert message: "Fraud or Error occurs. Check <DataName/s>" | |

Rule7

| IF the current message name is Returns | AND |
|---|---|
| message Inventory Receipt is not available | |
| THEN alert message: | |
| "Fraud or Error occurs. Check the item return process" | |

Rule8

| | |
|---|---|
| IF the current message name is Returns | AND |
| message Inventory Receipt is available | AND |
| ItemQuantity is not equal to the same field in the Inventory Receipt message THEN alert message: "Fraud or Error occurs. Check the item return process" | |

Rule9

| | |
|---|---|
| IF the current message name is "Credit note Entry" | AND |
| message "Returns" is available | AND |
| New "Inventory Receipt" message is not available THEN alert message: "Fraud or Error occurs. Check the item return process" | |

Rule10

| | |
|---|---|
| IF the current message name is New "Inventory Receipt" | AND |
| message "Returns" is available | AND |
| message "Credit note Entry" is available | AND |
| ItemNumber of Inventory Receipt equal the same field of Returns equal the same field of previously received message Inventory Receipt (old Inventory Receipt) | |
| | AND |
| ItemQuantity of new Inventory Receipt not equal ItemQuantity of old Inventory Receipt minus QuantityReturned of Returns THEN alert message: "Fraud or Error occurs. Check the item return process" | |

Rule11

| | |
|---|---|
| IF the current message is "Debit note Entry" | AND |
| message "Returns" is available THEN alert message: "Fraud or Error occurs. Check the item return process" | |

Typical actions and alerts provided by ARM (block 601 of FIG. 6) in relation to each of the rules described herein by way of example are presented in FIG. 21.

Figure 8:
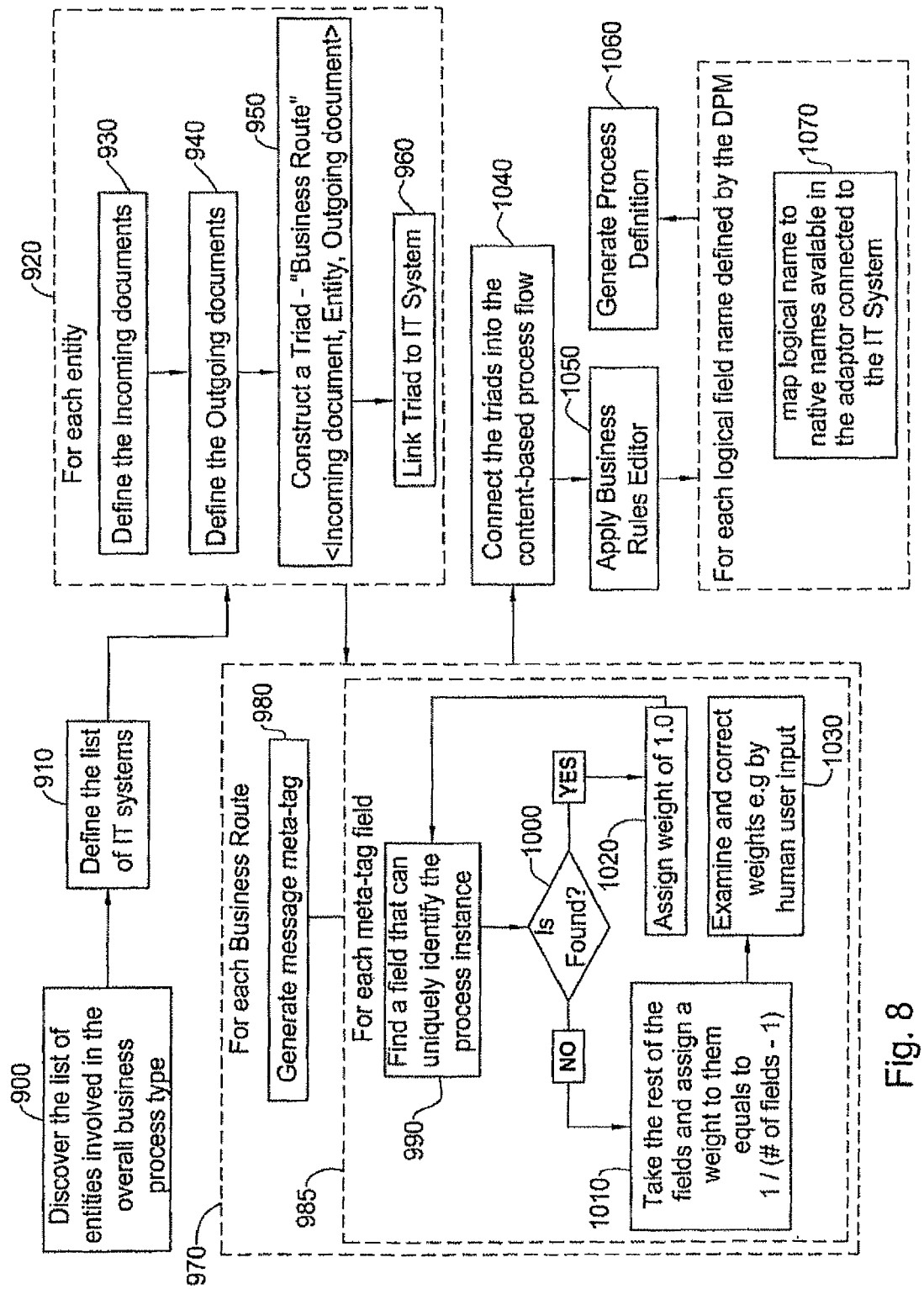
FIG. 8 is a method of operation of the Triad designer of FIG. 6, also termed herein "method 6" constructed and operative in accordance with certain embodiments of the present invention.

FIG. 8 is a simplified flowchart illustration of a method for generating triads, the method being constructed and operative in accordance with certain embodiments of the present invention. FIG. 8 is a simplified flowchart illustration of a method, constructed and operative in accordance with certain embodiments of the present invention, for performing the business route discovery steps 920 in the method of FIG. 8.

The methods include some or all of the steps shown in FIG. 8, suitably ordered e.g. as shown:

Step 900. Define the list of entities (inside and outside of our organization) that are involved in the certain overall business process type (buying process, for example) and list of IT (Information Technology) systems that serve within the organization for that purpose.

Then, (steps 920) for each discovered entity, define the Incoming documents and those deliver from Outgoing documents Link each triad to an IT (Information Technology) system that gets Incoming documents and delivers Outgoing documents (messages). A triad so constructed is also termed herein a "business route".

Step 980. Generate message meta-tag for each business route

A content of each message (structured or non-structured) may be considered as shown in FIG. 2, where some of the data fields (found synonymously and marked by symbol B) form the meta-tag. Get two triad messages (in and out) as defined in the IT (Information Technology) system linked to the given triad, and find the data fields that are available both in each of the messages and in the Meta-tag Spec. The meta-tag is generated. It may be applied on each triad's messages including those that divide the triad into two or more triads. Meta-tag Spec is the file that comprises all possible data field names enabling an identity for a specific customer, supplier, or employee at different steps of process execution. Examples of such data fields included in Meta-tag Spec for buying overall business process (supplier-centric embodiment) are: Supplier name, Supplier URL, PO date, PO number, Invoice number, Invoice date, Product name, Shipping order number, etc. Some of the fields may have a high priority in the single process identification, such as PO number, Invoice number, person's passport ID, and so on.

Steps 985. Generate weight for each of the meta-tag fields e.g. by applying the following rules: If a field has a high priority (a field that can uniquely identify a process instance such as PO ID or Invoice ID) its weight is by default 1. The weight of other fields in the meta-tag may be computed using the formula: 1.2: (number of fields—1).

If a meta-tag lacks fields with high priority, "a man in the loop" may define how many fields among those existing in the meta-tag may identify a single process in the given point. After computation of the formula above, a human user may correct the weights if desired (step 1030).

Step 1040. Connect the triads in the content-based process flow (network). To connect N triads in the process flow is the same as connect 2 triads. The connection of 2 triads is shown in FIG. 3. The message that relates for two different business routes may receive the meta-tag of the route where it is Incoming.

An example of connecting triads is as follows: Consider the following triads:
   a. sent purchase order ---> supplier ---> invoice
   c. sent purchase order ---> supplier---> shipping receipt
   The two can be combined to a single structure:
   sent purchase order -------> invoice
   |
      -------> shipping receipt As shown, there is now only one entity—"supplier"—which is responsible for execution of 2 business routes: sipping and invoicing.

Step 1050. Apply Business Rules Editor: define the data fields for controlling during process execution and those junctions where the value of each of the fields shall have the same value.

Step 1070. Mapping the messages and their fields that are defined in the triad structure by logical names into a message that is provided with adaptor from the IT (Information Technology) system like message brokering or from the database built business application like AccPac that uses it in native names, thereby to define which data the adaptor may fetch from the organization data source.

At the end of the process shown in FIG. 8 the Process Definition file may be sent to adaptor. Example of this file for the buying process is as follows:

```
<cf:Process ...>
...
<cf:Fields>
   <cf:String name="supplierNumber" nativeName="VDCODE" />
   <cf:String name="supplierName" nativeName="VDNAME" />
   <cf:String name="author" nativeName="AUDTUSER"/>
   <cf:Double name="total" nativeName="DOCTOTAL"/>
   <cf:String name="requisitionNumber" nativeName="RQNNUMBER"/>
   <cf:Date name="requisitionDate" nativeName="DATE"/>
   <cf:String name="responsibleName" nativeName="REQUESTBY"/>
   <cf:Table    name="requisitionItems"    nativeName="LINES"    alias="items" idColumn="ITEMNO">
     <cf:Columns>
        <cf:String name="itemNumber" nativeName="ITEMNO" />
        <cf:Double name="itemQuantity" nativeName="OQORDERED" />
        <cf:String name="itemName" nativeName="ITEMDESC" />
     </cf:Columns>
   </cf:Table>
<cf:String name="poNumber" nativeName="PONUMBER"/>
   <cf:Date name="poDate" nativeName="DATE"/>
   <cf:Table name="poItems" nativeName="LINES" alias=" items" idColumn="ITEMNO">
      <cf:Columns>
         <cf:String name="itemNumber" nativeName="ITEMNO" />
         <cf:String name="itemName" nativeName="ITEMDESC" />
         <cf:Double name="itemQuantity" nativeName="OQORDERED" />
         <cf:Double name="itemTotal" nativeName="EXTENDED" />
      </cf:Columns>
   </cf:Table>
</cf:Fields>
<cf:Junctions>
   <cf:Junction name="REQUISITION" nativeName="PORQNH1" type="">
      <cf:Service name="@ACCPAC_SERVICE"/>
      <cf:Fields>
      <cf:Field name="author" weight="0.4"/>
         <cf:Field name="supplierNumber" weight="0.4"/>
         <cf:Field name="supplierName" />
         <cf:Field name="requisitionDate" weight="0.4"/>
         <cf:Field name="responsibleName" weight="0.4"/>
         <cf:Field name="requisitionItems" />
         <cf:Field name="requisitionNumber" weight="1"/>
         </cf:Fields>
      </cf:Junction>
      <cf:Junction name="PO" nativeName="POPORH1" type="">
      <cf:Service name="@ACCPAC_SERVICE"/>
      <cf:Fields>
      <cf:Field name="author" />
      <cf:Field name="poDate" weight="0.4"/>
      <cf:Field name="supplierNumber" weight="0.4"/>
      <cf:Field name="supplierName" />
      <cf:Field name="total"/>
      <cf:Field name="poItems" />
      <cf:Field name="requisitionNumber" weight="1"/>
      <cf:Field name="poNumber" weight="1"/>
      </cf:Fields>
   </cf:Junction>
</cf:Junctions>
...
</cf:Process>
```

The file has lists of messages (junctions) that are to be retrieved from the data source. Junction Definition contains the list of the fields it has to read from the data source content.

All fields and junctions have a logical name and a native name, where native name describes the name of the field/message in the data source.

FIGS. 23A-23D, taken together, illustrate a table of properties of each of the business process nodes of FIG. 5 in logical names; this information may be stored in the process definition database 635 of FIG. 6, in accordance with certain embodiments of the present invention. According to an embodiment of the invention, there is provided a method of monitoring an overall business process through a content-routed network, message brokering tools, and a content management system comprising (a) content-based building of process model as a network of processing messages, (b) creating a meta-tag at each message-class involved in the network, (c) getting message-instances from a message repository created by each of at least one underlying message routers or brokers during message transportation, or database adaptor, (d) connecting a received message-instance to a process-instance in accordance with the message-class meta-tag and network; and (e) handling the received message-instances related to the same process-instance in accordance with the network. A table of message classes each having a meta-tag is shown, for example, in FIGS. 23A-D. The above steps a-e may be implemented in FIG. 6 particularly in the path from the adaptor to the correlation engine, and from the correlation engine to the monitor; this path typically handles message instances in accordance with a network provided with the Process Definition file.

The above Meta-tag Specification is typically predefined and may be used in the "Generate message meta-tag" step

980 in FIG. 8. Meta-tag examples are presented in FIGS. 23A-23D. These data fields are typically used by Methods 1, 2 and/or 5 (FIGS. 12, 14 and 16 respectively).

Process definition database 635 typically stores the meta-tag spec.

The meta-tag fields typically include those selected by the organization for use by the correlation methods shown and described herein, and also may include fields which the organization wishes to control, e.g. using rules as shown and described here.

Example: The supplier related content-centric overall business process model, which is shown graphically in FIG. 5, may be transformed in the form of Table as follows.

Content-centric process model Related to Supplier is shown in the Table of FIG. 23A-D.

Consider that there aren't content routers in an organization, just ESB (Enterprise Service Bus)/message broker of IBM, ERP system (such as AccPac) and Document management system (such as EMC Corporation's Documentum system). For this reason, the following types of adaptors are used: type 5—AccPac SQL Database adaptor, type 4—EMC Documentum adapor and type 1 or 2—WebSphere Message Broker adaptor. The use of each of these adaptors is described above.

FIG. 24A is a simplified diagram of an example of a suitable data structure for the process instance database 614 of FIG. 6. The term "transaction" is generally synonymous with the term "process instance". "Transaction Field" is generally synonymous with the term "process instance meta-tag". "Message property" is generally synonymous with the term "message meta-tag". "Message alert" is generally synonymous with the term "alert". "Message field" is usually synonymous with the standalone term "field".

Figure 24C:
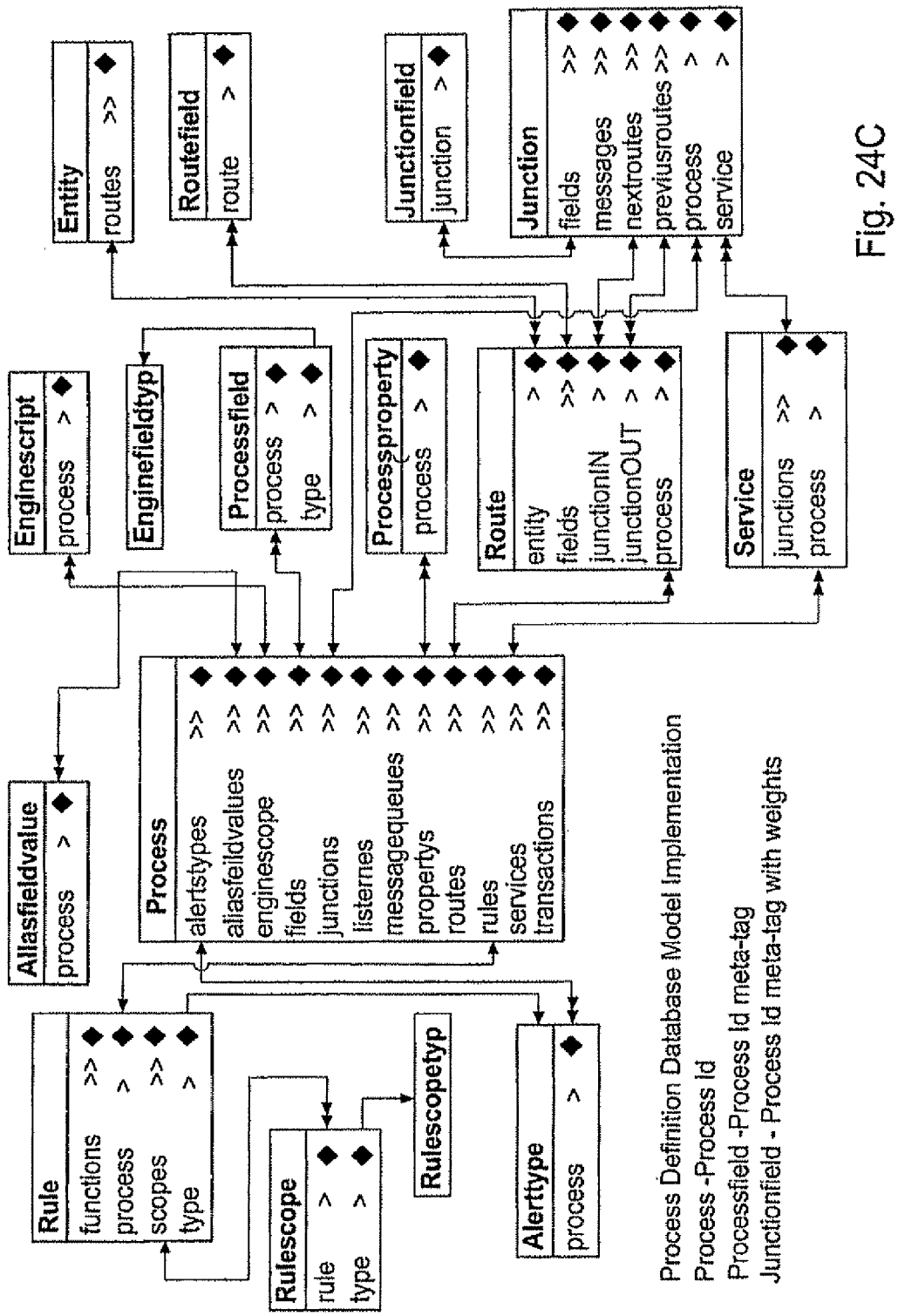
FIG. 24C is a simplified diagram of an example of a suitable data structure for the process instance database 614 of FIG. 6.

FIG. 24B is a simplified diagram of an example of a suitable data structure for the message queue database 620 of FIG. 6. This database comprises CFMessages only, and hence is not complex. FIG. 24C is a simplified diagram of an example of a suitable data structure for the process definition database 635 of FIG. 6. "Process" stores Process IDs, "processfield" stores process ID meta-tags, and "Junctionfield" stores process ID meta-tags with weights.

The following program is useful in implementing the system of FIG. 6:
  CREATE DATABASE IF NOT EXISTS pw_archives;
  USE pw_archives;
  Definition of table 'actions'—Defines the various ways 'alert' is handled.
    examples: Accept alert, Dismiss alert, forward email notification.

```
DROP TABLE IF 'actions' EXISTS;
CREATE TABLE 'actions' (
  'type' varchar(15) NOT NULL,
  'id' varchar(45) NOT NULL,
  'actionDescription' text NOT NULL,
  PRIMARY KEY USING BTREE ('id')
) ENGINE=InnoDB DEFAULT CHARSET=latin1;
```

Definition of table 'alertsdefintions'—Defines the types of alerts which PW handles.
    example for alert could be: 'Error in data'—'Incompatibilty of data fields between documents'
  DROP TABLE IF 'alertsdefintions' EXISTS;

```
CREATE TABLE 'alertsdefintions' (
  'id' int(10) unsigned NOT NULL,
  'title' varchar(45) NOT NULL,
  'pdid' int(10) unsigned NOT NULL default '1' COMMENT 'process defintion id',
  'description' varchar(100) NOT NULL,
  'responsible' int(10) unsigned NOT NULL,
  PRIMARY KEY USING B TREE ('id'),
  KEY 'FK_alertsdefintions_1' ('responsible'),
  CONSTRAINT 'FK_alertsdefintions_1' FOREIGN KEY ('responsible') REFERENCES 'responsibles' ('responsibleId')
) ENGINE=InnoDB DEFAULT CHARSET=latin1;
```

Definition of table 'alertsevents'—Table contains alerts instances that occurred in the system.

```
DROP TABLE IF EXISTS 'alertsevents';
CREATE TABLE 'alertsevents' (
  'alertId' int(10) unsigned NOT NULL,
  'date' datetime NOT NULL,
  'alertType' int(10) unsigned NOT NULL,
  'alertProperties' text NOT NULL,
  'status' varchar(45) NOT NULL,
  'transactionId' varchar(15) NOT NULL,
  'responsible' int(10) unsigned default NULL,
  'messageId' int(10) unsigned NOT NULL,
  PRIMARY KEY ('alertId'),
  KEY 'FK_alertsevents_1' USING BTREE ('alertType'),
  KEY 'FK_alertsevents_3' ('transactionId'),
  KEY 'FK_alertsevents_2' ('responsible'),
  CONSTRAINT 'FK_alertsevents_1' FOREIGN KEY ('alertType') REFERENCES 'alertsdefintions' ('id'),
```

-continued

```
  CONSTRAINT 'FK_alertsevents_2' FOREIGN KEY ('responsible') REFERENCES 'responsibles' ('responsibleId'),
  CONSTRAINT 'FK_alertsevents_3' FOREIGN KEY ('transactionId') REFERENCES 'transactions' ('id')
) ENGINE=InnoDB DEFAULT CHARSET=latin1;
```

Definition of table 'emailtrack'—incase of sending email using PW, table saves all information on the email content and the recipients

```
DROP TABLE IF EXISTS 'emailtrack';
CREATE TABLE 'emailtrack' (
  'alert' int(10) unsigned NOT NULL default '1',
  'emailContent' text NOT NULL,
  'responsibleTrack' text NOT NULL COMMENT 'list of all incharges',
  PRIMARY KEY USING BTREE ('alert'),
  CONSTRAINT 'FK_emailTrack_1' FOREIGN KEY ('alert') REFERENCES 'alertsevents' ('alertId')
) ENGINE=InnoDB DEFAULT CHARSET=latin1;
```

Definition of table 'junctions'—definition of all messages that PW may track.

```
DROP TABLE IF EXISTS 'junctions';
CREATE TABLE 'junctions' (
  'id' int(10) unsigned NOT NULL auto_increment,
  'name' varchar(45) NOT NULL,
  'nativeName' varchar(45) NOT NULL,
  'processId' varchar(45) NOT NULL,
  PRIMARY KEY ('id'),
  KEY 'FK_junctions_1' ('processId'),
  CONSTRAINT 'FK_junctions_1' FOREIGN KEY ('processId') REFERENCES 'processdefintion' ('id')
) ENGINE=InnoDB DEFAULT CHARSET=latin1;
```

Definition of table 'logs'—any action that has been done on alert (which may change its status) may be recorded here

```
DROP TABLE IF EXISTS 'logs';
CREATE TABLE 'logs' (
  'logId' int(10) unsigned NOT NULL auto_increment,
  'alertId' int(10) unsigned default NULL,
  'action' varchar(50) default NULL,
  'date' datetime default NULL,
  'responsible' int(10) unsigned default NULL,
  'comments' text,
  PRIMARY KEY USING BTREE ('logId'),
  KEY 'FK_logs_1' ('alertId'),
  KEY 'FK_logs_2' ('responsible'),
  CONSTRAINT 'FK_logs_1' FOREIGN KEY ('alertId') REFERENCES 'alertsevents' ('alertId'),
  CONSTRAINT 'FK_logs_2' FOREIGN KEY ('responsible') REFERENCES 'responsibles' ('responsibleId')
) ENGINE=InnoDB DEFAULT CHARSET=latin1;
```

Definition of table 'messages'—messages instances that PW has tracked.

```
DROP TABLE IF EXISTS 'messages';
CREATE TABLE 'messages' (
  'messageId' int(10) unsigned NOT NULL auto_increment,
  'transactionId' varchar(45) NOT NULL,
  'junctionId' int(10) unsigned NOT NULL,
  'fields' text NOT NULL,
  'date' datetime NOT NULL,
```

```
PRIMARY KEY USING BTREE ('messageId'),
KEY 'FK_messages_1' (transactionId'),
KEY 'FK_messages_2' ('junctionId'),
  CONSTRAINT 'FK_messages_1' FOREIGN KEY ('transactionId') REFERENCES
'transactions' ('id').
  CONSTRAINT 'FK_messages_2' FOREIGN KEY ('junctionId') REFERENCES 'junctions'
('id')
) ENGINE=InnoDB DEFAULT CHARSET=latin1;
```

Definition of table 'processdefinition'—saves the processdefinition.xml

```
DROP TABLE IF 'processdefinition 'EXISTS;
CREATE TABLE 'processdefinition' (
  'id' varchar(15) NOT NULL,
  'content' text NOT NULL,
  PRIMARY KEY ('id')
) ENGINE=InnoDB DEFAULT CHARSET=latin1;
```

Definition of table 'responsibles'—list of people and general data that are related to the PW system.

```
DROP TABLE IF 'responsibles'EXISTS;
CREATE TABLE 'responsibles' (
  'responsibleId' int(10) unsigned NOT NULL auto_increment,
  'name' varchar(45) NOT NULL,
  'jobtitle' varchar(45) NOT NULL,
  'email' varchar(45) NOT NULL,
  PRIMARY KEY USING BTREE ('responsibleId')
) ENGINE=InnoDB DEFAULT CHARSET=latin1;
```

Definition of table 'transactions'—instances of transactions that PW has tracked.

```
DROP TABLE IF EXISTS 'transactions';
CREATE TABLE 'transactions' (
  'id' varchar(45) NOT NULL,
  'startDate' datetime default NULL,
  'process' varchar(15) NOT NULL,
  'vendor' varchar(45) default NULL,
  'requestNumber' varchar(45) default NULL,
  'responsible' varchar(45) NOT NULL,
  PRIMARY KEY ('id')
) ENGINE=InnoDB DEFAULT CHARSET=latin1;
```

Applications: The ability to control and monitor a single process through disconnected IT (Information Technology) systems and human-driven activities, as described above, can be used as the underlying platform for creation of different solutions (applications) in different fields of business, such as overall selling process, overall buying process and overall insurance claim handling process. These and other possible solutions are dissimilar, mainly in a message-based embodiment, e.g. content of a message and content based process representation network. Typically, no functions, methods or system are changed as a result of applying the business solution or content enabled vertical application.

It should be noted that each of the message based embodiments produces a predefined list of fraud that does not depend on an industry or on a company of industry. It depends solely on the model (junctions it comprises). It is thus a process-related type of fraud, which may be detected only by applying instance level monitoring and instance level process correctness validation methods, such as embodiments of the present invention.

For example, the list of fraud that is provided in accordance with an embodiment of the present invention for overall buying business process (supplier-related embodiment) remains the same in any industry. This means that the suggested system is easy to implement because it comes with built-in message-based capabilities and may be initiated, based on the data junctions that are already available in the operational IT (Information Technology) infrastructure for other purposes and therefore may be used by this system as well. Such junctions comprise "popular data" that runs between enterprise applications, between applications and decision makers, between organizations or between people.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A system for control and monitoring a case comprising:
at least one processor; and
at least one memory storing instructions which when executed by the at least one processor causes the at least one processor to:
receive a first message of a first message type, which is created by a first entity, the first message comprising first values corresponding to meta-tag fields of a meta-tag spec;
correlate the first message and an enterprise process instance based on the on the first values from the first message by analyzing the first message against a plurality of triads, each triad comprising a characteristic of an incoming message, an identifier of an entity receiving the incoming message, and a characteristic of an outgoing message generated by the entity in response to receiving the incoming message;
in response to a match from the correlation between the first message and the enterprise process instance, link the first message to the enterprise process instance and create a first new triad in accordance with definitions of an data-centric process model,
apply one or more validation rules to validate the first message against one or more other messages of the enterprise process instance;

receive a second message of a second message type different than the first message type, which is created by a second entity, the second message comprising second values corresponding to the meta-tag fields of the meta-tag spec;

correlate between the second message and the enterprise process instance based on the second values from the second message by analyzing the second message against the plurality of triads in accordance with the data-centric process model;

in response to a match from the correlation between the second message and the enterprise process instance, link the second message to the enterprise process instance by adding the second message to the plurality of triads as an outgoing message generated by the entity in response to receiving the first message; and apply the one or more validation rules to validate the second message against the one or more other messages of the enterprise process instance in accordance with the data-centric process model.

2. The system of claim 1, wherein the at least one processor is further configured to execute instructions to:

receive a third message of a third message type different than the first and the second message types, which is created by a third entity, the third message type comprising third values corresponding to the meta-tag fields of the meta-tag spec;

correlate the third message and the enterprise process instance based on the third values;

in response to a match from the correlation between the third message and the enterprise process instance, link the third message to the enterprise process instance by adding the third message to the plurality of triads as an outgoing message generated by the entity in response to receiving the second message;

apply the one or more validation rules to validate the third message against the one or more other messages of the same enterprise process instance in accordance with the data-centric process model.

3. The system of claim 2, wherein the enterprise process involving a plurality of computerized devices, and wherein the first, second and third messages are exchanged between the plurality of computerized devices.

4. The system of claim 2, wherein at least one of the first, second and third messages is provided by a content management platform or a content routing network, or Application Programming Interface call from an external activity or process.

5. The system of claim 2 wherein the at least one processor is further configured to execute instructions to:

initiate a connection between a data source and the case management system using a web service or database connector; and in response to a trigger condition, build and send a message of the first, second or third types, wherein the trigger condition is associated with a change in database of an entity involved in the enterprise process.

6. The system of claim 2, wherein the instructions further cause the at least one processor to analyze the enterprise process instance and to generate an alert, based on an identified inconsistency between two or more of the first, second and third messages associated with the enterprise process instance.

7. The system of claim 6, wherein the identified inconsistency is selected from a group consisting of field discrepancies and duplicates.

8. The system of claim 6, wherein the alert is based on an identified bypass within the enterprise process instance in accordance with the data-centric process model.

9. The system of claim 2, wherein the first message type is a purchase order, wherein the second message type is an invoice, wherein the third message type is a payment, and wherein the payment is the outcome and the purchase order and invoice are required to create the payment.

10. The system of claim 2, wherein the meta-tag fields of the meta-tag spec comprises at least: a purchase order number field and an invoice number field.

11. The system of claim 2, wherein the correlations do not uniquely identify the enterprise process instance.

12. The system of claim 2, wherein the instructions further cause the at least one processor to create a structured file embodying the data-centric process model comprising:

descriptions of a plurality of different message types presented by a document, message schema, or database table, or short message service message as a node in a graph;

relationships between various nodes in the graph, relationships associated with a computerize system, process or operation that takes a first node as incoming message type and a second node as outgoing message type; and definition of associations between a data field name of a message type and a data field of message instance to be provided with different data sources to make them analogous;

adding to each message type an incoming or outgoing characteristic.

13. The system of claim 12, wherein the triad is extracted from a workflow process represented by Business Process Execution Language or Web service Description Language.

14. The system of claim 12, wherein the meta-tag spec is stored in a data-centric process definition database.

15. The system of claim 12, wherein the graph is built by using the plurality of triads.

16. The system of claim 2, wherein at least one of the first, second or third messages is obtained from an unstructured data source, the unstructured data source is selected from a group consisting of: fax, email and HTTP page.

17. The system of claim 2, comprising further instructions which when executed by the at least one processor, causes the at least one processor to:

compare the at least one first value with the at least one third value; and in response to the values being not equal, determine an exception to the third message.

18. The system of claim 2, wherein values of the meta-tag spec associated with meta-tag of first and second and third message types are identifiers of the enterprise process instance.

19. The system of claim 2 wherein the first, second and third messages are analyzed in in real-time.

20. The system of claim 1, wherein in response to a no match from the correlation between the first message and the enterprise process instance, initiate a new instance of the enterprise process.

21. The system of claim 1, wherein the first message and the second message associated with the enterprise process instance have a same content.

22. The system of claim 1, wherein a state of the enterprise process instance is defined by the first or second messages correlated at a given time.

* * * * *